United States Patent [19]

Chang et al.

[11] Patent Number: 5,627,979
[45] Date of Patent: May 6, 1997

[54] SYSTEM AND METHOD FOR PROVIDING A GRAPHICAL USER INTERFACE FOR MAPPING AND ACCESSING OBJECTS IN DATA STORES

[75] Inventors: Daniel T. Chang, San Jose, Calif.; Christina Lau, Ontario, Canada; Taejae Lee, Cupertino, Calif.

[73] Assignee: International Business Machines Corporation, Armonk, N.Y.

[21] Appl. No.: 276,389

[22] Filed: Jul. 18, 1994

[51] Int. Cl.⁶ .................................................. G06F 3/00
[52] U.S. Cl. .......................... 395/335; 395/613; 395/615; 395/349; 395/968
[58] Field of Search ................................. 395/155, 600, 395/159

[56] References Cited

U.S. PATENT DOCUMENTS

| | | | |
|---|---|---|---|
| 4,930,071 | 5/1990 | Tou et al. | 364/300 |
| 5,235,701 | 8/1993 | Ohler et al. | 395/600 |
| 5,295,242 | 3/1994 | Mashruwala et al. | 395/159 |
| 5,404,440 | 4/1995 | Asahi | 395/155 |
| 5,408,659 | 4/1995 | Cavendish et al. | 395/650 |
| 5,412,774 | 5/1995 | Agrawal et al. | 395/157 |
| 5,437,027 | 7/1995 | Bannon et al. | 395/600 |
| 5,448,727 | 9/1995 | Annevelink | 395/600 |
| 5,548,749 | 8/1996 | Kroenke et al. | 395/600 |
| 5,555,367 | 9/1996 | Premerlani et al. | 395/161 |

*Primary Examiner*—Raymond J. Bayerl
*Assistant Examiner*—A. Katbab
*Attorney, Agent, or Firm*—Prentiss Wayne Johnson

[57] ABSTRACT

A graphical user interface for mapping and accessing objects in data stores is disclosed. A user may define a mapping between object schema and data store schema by use of a high level language, Schema Mapping Definition Language (SMDL), which is data store independent, object oriented language independent, and extensible. The user may either write SMDL directly or generate SMDL through the use of a graphical user interface Smart Schema whose graphical semantics support the SMDL semantics. A Schema Mapping Internal Representation (SMIR) containing representations of the object schema, the data store schema, and the mapping of the object schema and the data store schema is generated by an SMDL Parser from the SMDL. The SMIR is represented such that it may be accessible by both development interfaces and run-time environments. It supports the accessing of the mapping information given either the object schema or data store schema such that the data store schema may be accessed from the object schema, and the object schema may be accessed from the data store schema. An SMDL Generator may be used to generate the SMDL from the SMIR. The SMIR, SMDL Generator, SMDL Parser, and SMDL may be registered in a Data Store Manager (DSM) having a single, uniform, object oriented application programing interface for accessing one or more data stores, regardless of the type of data store. The DSM may use the SMIR to access objects from a data store. The SMIR may also be used by a run-time environment to provide direct access of objects from a data store, or it may be used by various Code Generators to generate an object oriented programing language for providing direct access to objects from a data store.

6 Claims, 14 Drawing Sheets

SYSTEM AND METHOD FOR PROVIDING A GRAPHICAL USER INTERFACE FOR MAPPING AND ACCESSING OBJECTS IN DATA STORES

CROSS-REFERENCE TO RELATED APPLICATIONS

Application Ser. No. 08/276,382, filed concurrently herewith on Jul. 18, 1994 for A SYSTEM AND METHOD FOR MAPPING AND ACCESSING OBJECTS IN DATA STORES (IBM Docket ST9-94-016), currently co-pending, and assigned to the same assignee as the present invention.

Appliation Ser. No. 08/276,747, filed concurrently herewith on Jul. 18, 1994 for A SYSTEM AND METHOD FOR PROVIDING A HIGH LEVEL LANGUAGE FOR MAPPING AND ACCESSING OBJECTS IN DATA STORES (IBM Docket ST9-94-018), currently co-pending, and assigned to the same assignee as the present invention.

The foregoing copending applications are incorporated herein by reference.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to object oriented systems and data store systems, and more particularly to mapping between object schema and data store schema.

2. Description of the Related Art

The data processing industry and its customers have made considerable investments in conventional data store technology, including relational databases, hierarchial databases, flat file databases, and network databases. Presently, the relational or entity-relationship model underlying relational databases is the predominant conventional method of storing data in databases.

Object oriented technology has also gained wide acceptance due to its strengths in real world modeling, modularity, reuse, distributed computing, client/server computing, and graphical user interfaces.

However, the object model underlying object oriented technology and the data model underlying conventional data stores are different, and a way is needed to provide the advantages of object oriented technology while preserving the substantial investment in conventional data store technology.

An object model captures the structure of a system by representing the objects in the system, the relationships between those objects, and the attributes and operations that characterize each class of objects. The purpose of object modeling is to describe objects, and an object is simply something that has a meaningful behavior in an application context. An object has data, the value of which represent the object's state. The behavior that an object exhibits is provided by operations on that data, and this behavior may be invoked by other objects sending messages. These operations are implemented as procedures called methods. All objects have identity and are distinguishable. The term identity means that an object is distinguishable by its inherent existence and not by descriptive properties that it may have. A unique object may be referred to as an object instance or an instance.

An object class describes a group of objects with similar properties (attributes), common behavior (operations), common relationships to other objects, and common semantics. Objects in a class have the same attributes and behavior patterns. The objects derive their individuality from differences in the attribute values and relationship to other objects. The class defines the object's data structure and methods to access that data structure. Methods and data structure are shared among objects of the same class. An object knows its class and the methods it possesses as a member of the class. Common definitions such as class name and attribute names are stored once per class, rather than once per object instance. Operations may be written once for a class so that all objects in the class benefit from code reuse.

An attribute is a data value, not an object, held by the objects in a class. Each attribute has a value for each object instance. Different object instances may have the same or different values for a given attribute. Each attribute name is unique within a class, as opposed to being unique across all classes.

A link is a relationship between object instances, a tuple or ordered list of object instances. A link is also an instance of an association. An association is a group of links with common structure and common semantics. All the links in an association connect objects from the same classes. An association describes a set of potential links in the same way that a class describes a set of potential objects. Associations are inherently bidirectional and can be traversed in either direction. Associations are often implemented in various object oriented programming languages as pointers from one object to another. A pointer is an attribute in one object that contains an explicit reference to another object.

As an attribute is a property of objects in a class, a link attribute is a property of the links in an association. Each link attribute has a value for each link. Many-to-many associations are the rationale for link attributes.

Generalization and inheritance are powerful abstractions for sharing similarities among classes while preserving their differences. Generalization is the relationship between a class and one or more refined versions of it. The class being refined is called the superclass, and each refined version is called a subclass. Attributes and operations common to a group of subclasses are attached to the superclass and stared by each subclass. Each subclass is said to inherit the features of its superclass. Generalization and inheritance are transitive across an arbitrary number of levels. The terms ancestor and descendent refer to generalization of classes across multiple levels. An instance of a subclass is simultaneously an instance of all of its ancestor classes. The state of an instance includes a value for every attribute of every ancestor class. Any operation on any ancestor class can be applied to an instance.

Generalization and inheritance are fundamental concepts in object-oriented languages, and these concepts do not exist in conventional languages and databases. During conceptual modeling, generalization enables a developer to organize classes into a hierarchial structure based on their similarities and differences. During implementation, inheritance facilitates code reuse. Generalization refers to the relationship among classes; inheritance refers to the mechanism of obtaining attributes and operations using the generalization structure.

The object schema may be viewed as consisting of a set of object classes, wherein each object class consists of a set of object instances, wherein each object instance contains a set of attributes, and wherein object classes and object instances may be linked in relationships.

Instead of the above object model, conventional data store technology uses a data model in which a data model (also known as an information model or conceptual model) is designed by modeling the world that the application is to support. Then the data model is transformed into a particular database design by applying one or more standard transforms, for example, normalization which requires that data of an entity belong to that entity only.

The data models offered by conventional database technology include flat files, indexed file systems, network data model, hierarchial data model, and the relational model.

The flat file model provides a simple means of storing data in records which may be accessed according to the data therein; however, it provides no independence between the data and applications thus requiring the applications to be modified if the flat file design is changed. A flat file data store schema consists of records composed of fields.

Indexed file systems provide fixed-length records composed of data fields of various types, and indexes to more quickly locate records satisfying constraints on field values. An indexed file system data store schema consists of records composed of fields wherein certain fields may be keys (indexes).

A network data model provides fixed-length records composed of data fields of various types and indexes similar to the indexed file systems. In addition, the network data model provides record identifiers and link fields which may be used to connect records together for fast direct access. The network data model also uses pointer structures to encode a network structure or relationship of records. A network data store schema consists a set of network structures of records, wherein each record is composed of fields, wherein certain fields may be keys (indexes) and certain fields may be links to other records (link fields).

The hierarchial data model, similar to the network data model, provides fixed-length records composed of data fields of various types, indexes, record identifiers and link fields, and pointer structures. However, the hierarchial data model limits the structure used to represent the relationship of records to tree structures. A hierarchial data store schema consists of a set of tree structures of segments (each tree structure defined by a pointer structure known as a Program Communication Block or PCB), wherein each segment consists of fields, and wherein certain fields may be keys (indexes), and wherein certain segments may be links or pointers to other segments (pointer segment).

In the relational data model, the fundamental structure is the relation, which is a two-dimensional matrix consisting of columns and rows of data elements. A table is an instance of a relation in the relational data base. Each table has a name. A table must consist only of atomic fields of data, i.e., each field is a simple, indivisible type of data. A field is the basic unit of data representing one data fact.

Each column has a label and contains atomic values of the same data type, wherein each atomic value is an attribute drawn from a set of possible values that is that column's domain. The order of columns is not significant and may be changed without changing the meaning of a tuple. Each column may be referred to by a unique pairing of the table name with the column label.

Each table consists of zero or more tuples, which are rows of attribute values. Each row represents one relationship, and a row's identity is determined by its unique content, not by its location. The order of rows is not significant. There are no duplicate rows. The domain for every attribute must consist of atomic value; there are no repeating groups. If the value for a particular field is unknown or does not apply, then the relational mod assigns a null value.

Tables contain information about entities or the relationship between entities. Each tuple refers to a different entity, and each attribute value in the tuple supplies information about one characteristic of that entity. Each table must have a column or group of columns that serve to uniquely identify the tuple.

Each set of attributes that uniquely identifies each tuple is referred to as a candidate key. There may be multiple candidate keys in a relation, but one must be designated as the primary key. Foreign keys are used to define a link to another table. A foreign key is a key taken from another table to create a linking value to serve as a means of navigation from one table to the other table. A table may contain as many foreign keys as links it requires to relate it to other tables with which it has relationships.

The process of determining the correct location and function for each attribute to correctly formulate the relational schema is called normalization. Normalization decomposes incorrectly constructed relations into multiple correctly normalized relations.

The relational model requires that all tables must be in at least first normal form. To be in first normal form, a relation must have domains consisting only of atomic values for each attribute. Repeating sets of attributes and multi-valued attributes are not allowed. Optionally, the relational model may be subject to additional higher forms of normalization based on functional dependency, i.e., the reliance of an attribute or group of attributes on another attribute or group of attributes for its value.

The relational schema may be viewed as consisting of a set of tables, wherein each table consists of columns and rows, and wherein relations between table are specified by primary keys and foreign keys.

In view of the above differences between object oriented technology and data store technology, there is a need for a method of, and apparatus for, allowing a user to access a conventional data store from an object oriented application.

In view of the above differences between object schema and data store schema, there is a need for a method of, and apparatus for, allowing a user to map between conventional data store schema and object schema.

In view of the above, there is a need for a method of, and apparatus for, allowing a user to define a mapping between conventional data store schema and object schema.

In view of the above, there is a need for a method of, and apparatus for, allowing a user to represent such, a definition of a mapping between conventional data store schema and object schema.

In view of the above differences between conventional data store schema, there is a need for a data store independent method of, and apparatus for, meeting the above needs.

In view of the above, there is a need for an object oriented language independent method of, and apparatus for, meeting the above needs.

In view of the above, there is a need for a distributed client/server method of, and apparatus for, meeting the above needs.

In view of the above, there is a need for a method of, and apparatus for, providing a user an improved user interface to meet the above needs.

SUMMARY OF THE INVENTION

The invention disclosed herein comprises a method of, and system for, mapping and accessing objects from a conventional data store. The invention disclosed herein also comprises a method of, and system for, providing a high level language for mapping and accessing objects from a conventional data store. The invention disclosed herein also comprises a method of, and system for, providing a user interface for mapping and accessing objects from a conventional data store.

In accordance with one aspect of this invention, an object oriented application programming interface to a data store manager provides a uniform and single interface for accessing one or more conventional data stores, regardless of the type of conventional data store.

In accordance with another aspect of the present invention, a Smart Schema allows a user to mad between object schema and conventional data store schema, regardless of the type of conventional data store.

In accordance with another aspect of the present invention, a user may define a mapping between object schema and data store schema by use of a high level language, Schema Mapping Definition Language. The user may either write SMDL directly or generate SMDL through the use of the Smart Schema. The Schema Mapping Definition Language is data store independent, object oriented language independent, and extensible.

In accordance with another aspect of the present invention, a definition of a mapping between object schema and conventional data store schema is represented by a Schema Mapping Internal Representation. The Schema Mapping Internal Representation contains representations of the object schema, the data store schema, and the mapping of the object schema and the data store schema. These representations are such that the Schema Mapping Internal Representation may be accessible by both development interfaces (Smart Schema and Smart Access) and run-time environments, or it may by used to generate an object oriented programming language for providing direct access to a data store. It supports the accessing of the mapping information given either the object schema or data store schema. In other words, the data store schema may be accessed from the object schema, or the object schema may be accessed from the data store schema. The Schema Mapping Internal Representation is generated by a Schema Mapping Definition Language Parser which parses the Schema Mapping Definition Language into the Schema Mapping Internal Representation. A Schema Mapping Definition Language Generator may also be used to generate the Schema Mapping Definition Language from the Schema Mapping Internal Representation. The Schema Mapping Internal Representation, the Schema Mapping Definition Language Generator, the Schema Mapping Definition Language Parser, and the Schema Mapping Definition Language reside in a Data Store Manager after a user has registered the mapping and access methods with the Data Store Manager. The Data Store Manager may utilize the Schema Mapping Internal Representation which embodies the mapping definition in order to access objects from a data store. The Schema Mapping Internal Representation may be used by a run-time environment to provide direct access to a data store, or it may be used to generate an object oriented programming language for providing direct access to a data store.

In accordance with another aspect of the present invention, data store independence is provided by the use of the data store independent Schema Mapping Definition Language, the data store independent Schema Mapping Internal Representation, and the single, uniform, data store independent interface to a Data Store Manager.

In accordance with another aspect of the present invention, object oriented language independence is provided by the use of the object oriented language independent Schema Mapping Definition Language, the object oriented language independent Schema Mapping Internal Representation, and Code Generators which generate code in various object oriented languages from the Schema Mapping Internal Representation for accessing objects from data stores. These Code Generators may be used to generate access methods based on the Schema Mapping Internal Representation for accessing objects from a data store. To provide such access to a data store, a Code Generator may generate a combination of object oriented programming language and data store access language. The system then generates a make file describing the dependency of files, invokes the proper compilers, links the appropriate run-time libraries, and creates executable code for accessing a data store.

In accordance with another aspect of the present invention, distributed client/server access of objects from conventional data stores is provided by use of one or more Client Data Store Managers and one or more Server Data Store Managers.

In accordance with another aspect of the present invention, a graphical user interface, Smart Schema, is provided for mapping object schema to data store schema wherein the graphical semantics support the Schema Mapping Definition Language semantics. Another graphical user interface, Smart Access, allows an end user to access objects in a data store without the end user having to do any write application programming. The Smart Access user interface allows the user to test mapping and access methods registered with the Data Store Manager without having to write an application to access the objects from the data store in a run-time environment.

BRIEF DESCRIPTION OF THE DRAWINGS

For a more complete understanding of the present invention and the advantages thereof, reference is now made to the Detailed Description in conjunction with the attached Drawings, in which.

DESCRIPTION OF THE PREFERRED EMBODIMENT

1. Overview

Figure 1:
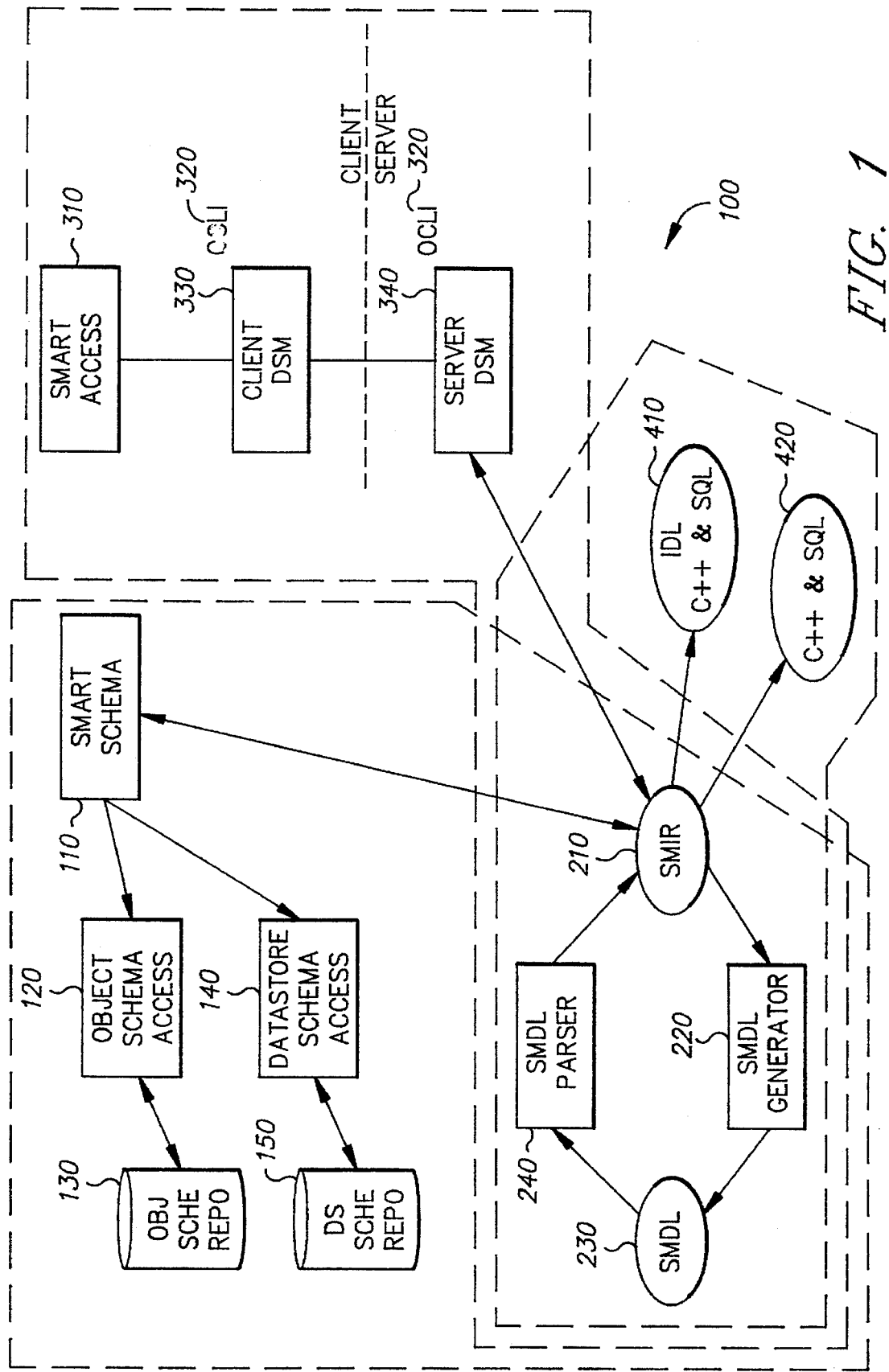
FIG. 1 shows the components of a system for mapping and accessing objects in a data store.
Figure 2:
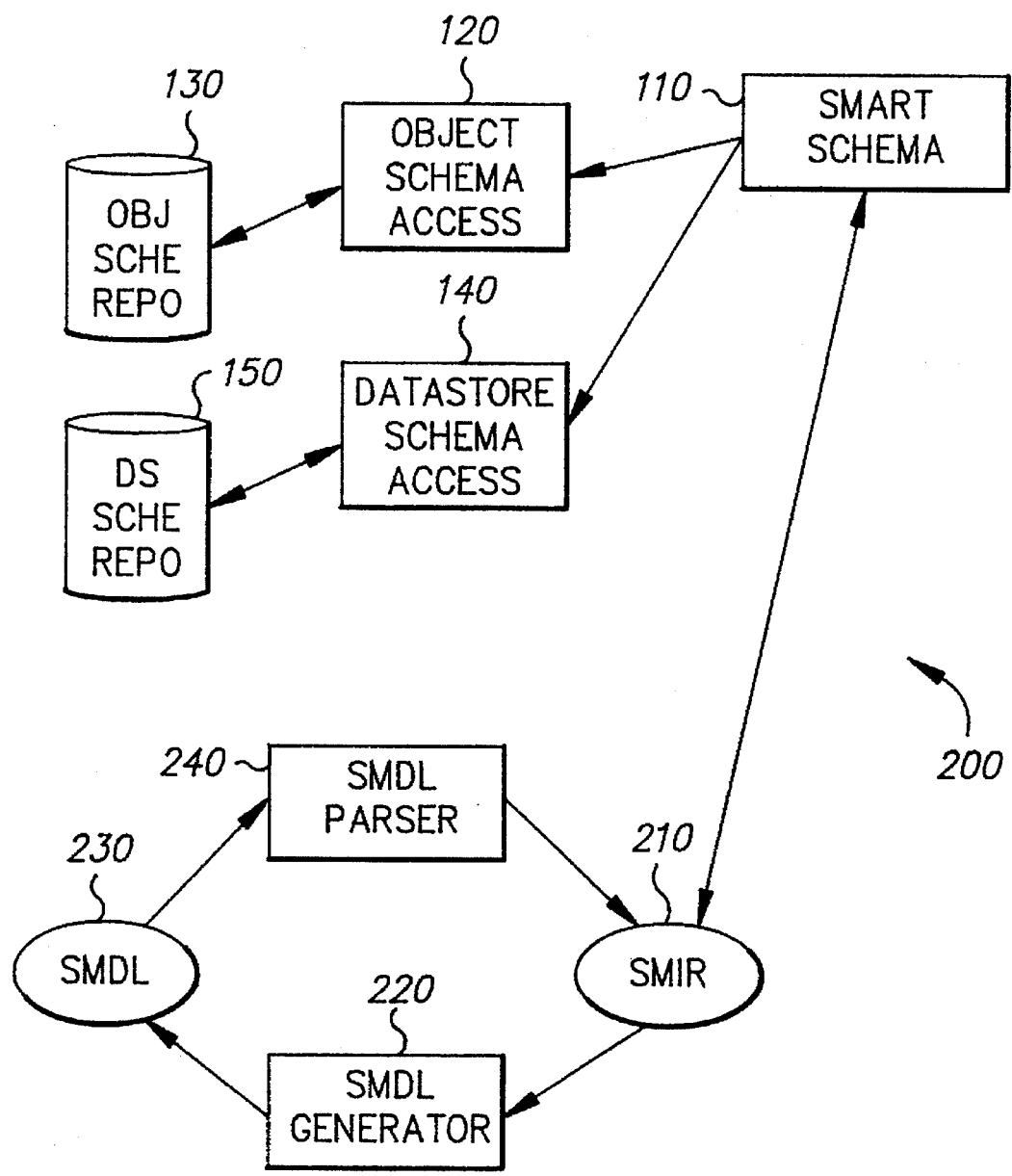
FIG. 2 shows the components of a system for mapping objects in a data store.

FIG. 1 shows the components of the preferred embodiment of this invention for mapping and accessing objects in a data store. The term data store is used herein to mean any persistent storage including, but not limited to, relational databases, hierarchial databases, network databases, object oriented databases, indexed file systems, or flat file systems. The preferred embodiment maps objects to a relational database or hierarchial database and then accesses those objects from the respective databases. The system herein can also be used to map objects to object oriented databases and to access those objects from the database, or to map and access object from other persistent storage such as network databases or file systems.

A graphical user interface, referred to as Smart Schema, 110, FIG. 1, maps object schema to data store schema. The Smart Schema has three Darts: Object Schema Generator, Relational Schema Generator, and Schema Mapper. See Section 2 ("Smart Schema") below for a more detailed description of a preferred embodiment of the Smart Schema. In mapping object schema to data store schema, the schema mapper of the Smart Schema can access the object schema information from a repository 130 of object schema by the object schema access, 120. For example, the repository 130 may be the Object Management Group (OMG) Interface Repository or IBM's System Object Model (SOM) Interface 28 Repository as described in *SOM Toolkit Users Guide*, Version 2.0, June 1993. The smart schema can also access the data store schema from a data store schema repository 150 by the data store schema access 140. For a relational database, the data store schema repository 150 is the relational database catalog. See Section 3 ("Schema Mapping Internal Representation") below for a more detailed description of and an example of an object schema and a data store schema.

The above user interface, including the Smart Schema 110 and the object schema access 120 and the data store schema access 140, allows a user to map object schema to a data store schema. The system of this invention then embodies, in a data structure, Schema Mapping Internal Representation, (SMIR) 210, the mapping of the object schema to a data store schema from the user interface. The internal data structure 210, contains representations of the object schema, the data store schema, and the mapping of the object schema and the data store schema. These representations are such that the SMIR may be accessible by both development interfaces (Smart Schema 110 and Smart Access 310) and run times 330 and 340. The SMIR supports run-time and facilitates the accessing of the mapping information given either the object schema or data store schema. In other words, one may readily access the data store schema from the object schema, or one may readily access the object schema from the data store schema. The SMIR 210 can be used by a run-time environment, or it can by used to generate an object oriented programming language for providing direct access to a data store, as described below. The system 100 can also automatically layout or generate the graphical user interface representation of the mapping from the internal data structure SMIR. See Section 3 ("Schema Mapping Internal Representation") below for a more detailed description of a preferred embodiment of the SMIR.

The system 100 includes a Schema Mapping Definition Language (SMDL) generator 220 which generates, from the SMIR, a high level language (SMDL) 230 which represents the mapping. The user has a choice of either using the user interface 110 to define the mapping or use the Schema Mapping Definition Language (SMDL) high level language directly to define the mapping. As such, SMDL is created, either through a user, or it is generated by the system from the internal data structure SMIR. See Section 4 ("Schema Mapping Definition Language") below for a more detailed description of a preferred embodiment of the Schema Mapping Definition Language.

The system 100 also includes a Schema Mapping Definition Language parser 240 which parses the SMDL high level language into the SMIR 2110. Given the definition of the SMIR in Section 3 ("Schema Mapping Internal Representation") below and the definition of the SMDL in Section 4 ("Schema Mapping Definition Language") below, those skilled in the art recognize that existing parsing and code generation techniques may be used to implement the Schema Mapping Definition Language (SMDL) generator 220 and the Schema Mapping Definition Language parser 240.

After a user has defined object schema, data store schema, and the mapping between the object schema and data store schema, and generated access methods using the Smart Schema 110, the user may register the mapping and access methods with a Data Store Manager (DSM), 340, 350, 360, 370, or 380, to provide access of objects from a data store (450, 460, 470, 480, or 490 of FIG. 4) in a run-time environment. A graphical user interface, Smart Access, 310, is provided for such registration. In addition, the Smart Access user interface 310 allows the user to test mapping and access methods registered with the Data Store Manager without having to write an application to access the objects from the data store in a run-time environment. Smart Access 310 provides the capabilities to select a class and perform object manipulation operations such as adding, retrieving, updating, deleting, and querying objects from the data store.

To accomplish this object manipulation through data store access, the Smart Access graphical user interface 310 calls an object-oriented application programing interface (API), Object Call Level Interface, OCLI, 320. Although a user (end user, programmer, or an application program) may access data objects through the OCLI API 320 directly, independently of the Smart Access graphical user interface 310, the Smart Access graphical user interface 310 allows an end user to access objects without the end user having to do any write application programming.

The OCLI API 320 is based on the Object Management Group (OMG) Persistent Object Service API as described in IBM/JOSS Object Services Persistence Service Specification, OMG TC Document 93.5.7, Nov. 15, 1993, herein incorporated by reference; or OMG Common Object services Specification (COSS) Volume 1, herein incorporated by reference.

Figure 4:
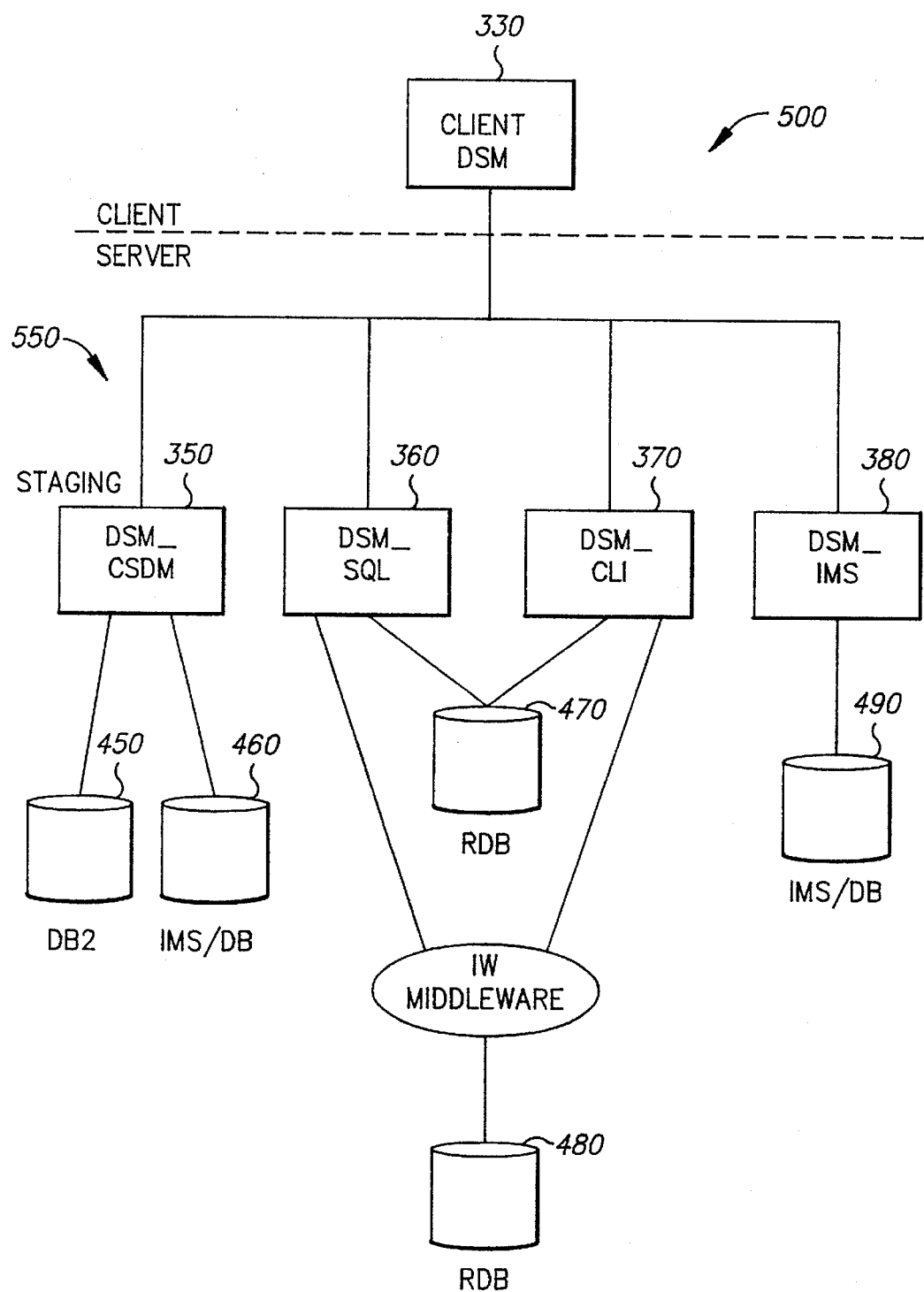
FIG. 4 shows a preferred embodiment of this invention in a client/server environment having various different types of data stores such as a relational database and a hierarchial database.

A run-time component may execute the OCLI API 320 and implement the accessing of objects from a data store. Referring now to FIG. 4, the run-time component, generally referred to as 500, i.e., environment, comprises, for each client, a client data store manager 330; and one or more server data store managers (DSM) 350, 360, 370, and 380. As further shown in FIG. 4, the client data store manager 330 provides a uniform and single interface to server data store managers, regardless of the type of data store in the server, generally referred to as 550. For example, data store manager 360 for a relational database (RDB) 470 may use embedded dynamic SQL statements to access data, or a data store manager 370 for the relational database 470 may use X/Open SQL call level interface (CLI) to access data. A client/server data store manager 350 can access both a DB2 database 450 and an IMS/DB database 460, and can provide caching and staging capability. For example, data can be downloaded to a mobile computer and uploaded at a later time. A data store manager 380 can access an IMS/DB database 490. The client data store manager 330 delegates and routes a call from the OCLI API to the proper server data store manager.

Figure 3:
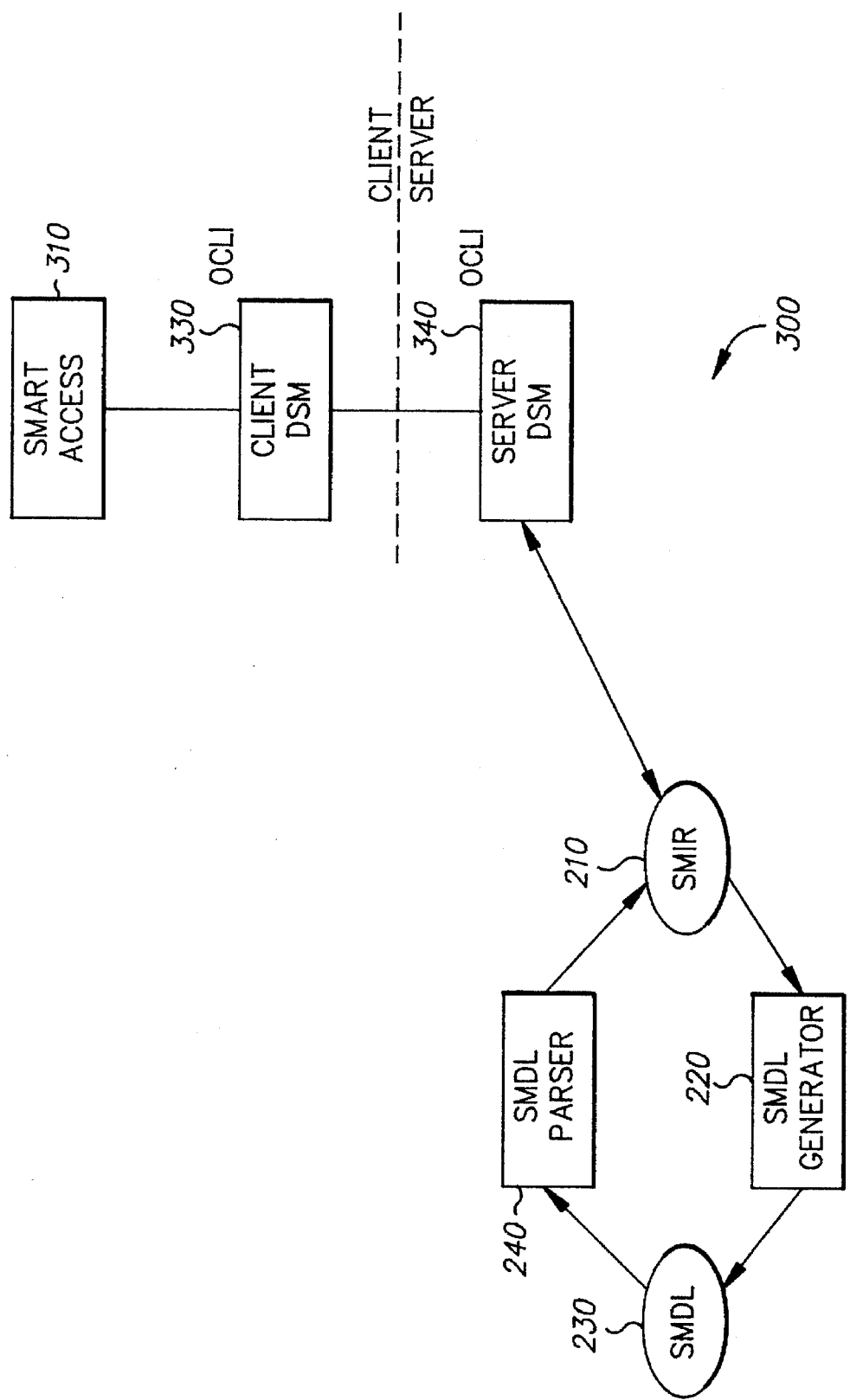
FIG. 3 shows the components of a system for accessing objects in a data store.

As shown in FIG. 3, the SMIR internal data structure 210, the SMDL generator 220, the SMDL parser 240, and the SMDL high level language 230 reside in each server data store manager 340. The server data store manager 340 utilizes the SMIR data structure 210 which embodies the mapping definition in order to access objects from a data store. The EMIR data structure 210 may be used by a run-time environment 500 to provide direct access to a data store. The EMIR data structure may also be used to generate an object oriented programming language for providing direct access to a data store.

Figure 5:
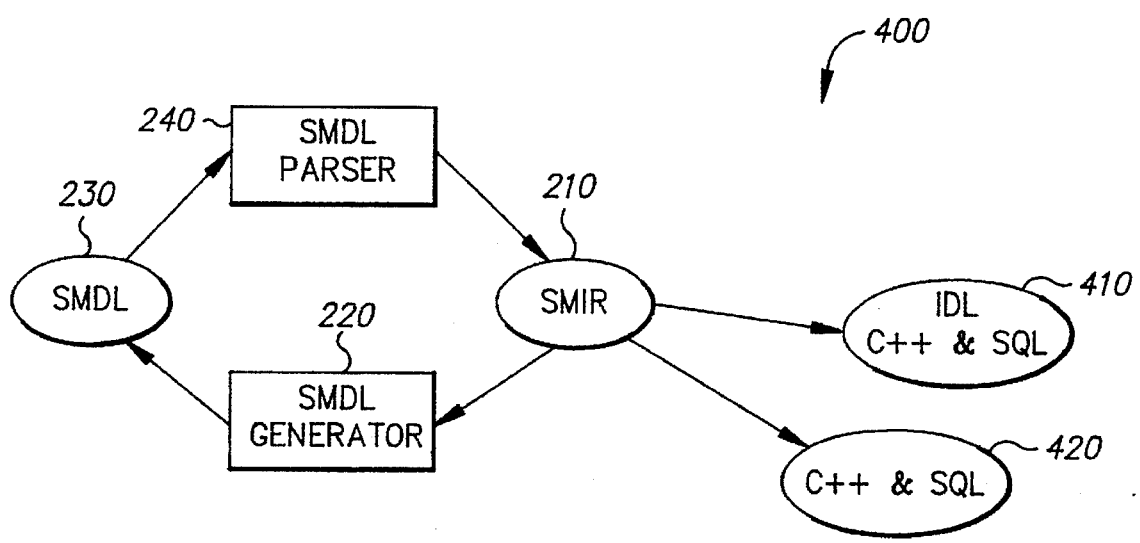
FIG. 5 shows the components for generating an object oriented programming language and a data access language for providing direct access to data stores.
Figure 6:
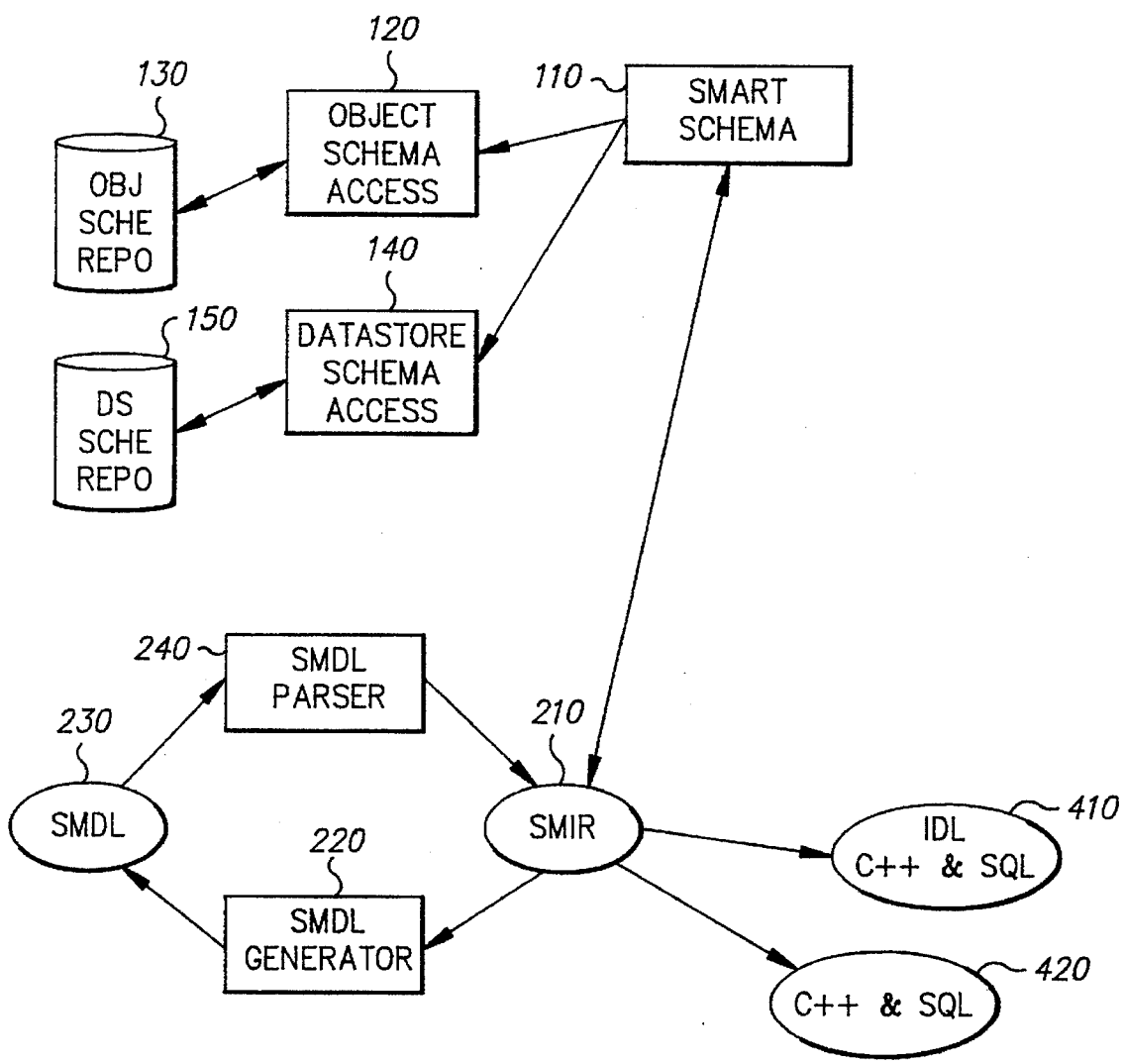
FIG. 6 shows a system for mapping objects in a data store and generating a object oriented programming language and a data access language for providing direct access to a data store.

To provide such access to a data store, code generators may be used to generate access methods based on the EMIR data structure. Referring now to FIG. 5, a code generator, such as 410, may generate System Object Module (SOM) interface definition language (IDL), C++ programming language, and embedded SQL codes from the SMIR 210. Another code generator, such as 420, may generate C++ programming language, and embedded SQL codes from the SMIR 210. Other code generators could generate other object oriented programming languages such as SmallTalk, and other data access languages such as DL/1. Each code generator generates a combination of a object oriented programming language such as C++, and a data access language such as SQL. The system then generates a make file describing the dependency of files, invokes the proper compilers, links the appropriate run-time libraries, and creates executable code for accessing a data store. For a more detailed description of code generation, see Section 5. ("Code Generation").

2. Smart Schema

A graphical user interface, referred to as smart Schema, 110, FIG. 1, maps objects schema to a data store schema. The Smart Schema has three parts: Object Schema Generator, Relational Schema Generator, and Schema Mapper.

Figure 7:
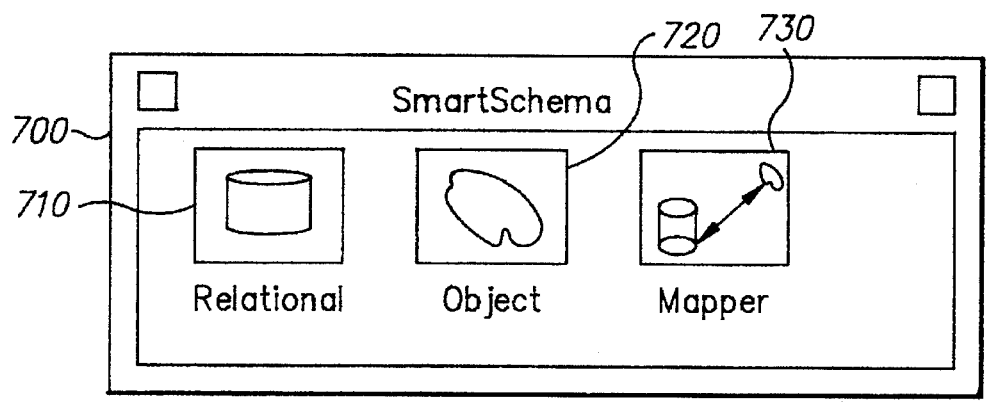
FIG. 7 through FIG. 27 illustrate graphical user interfaces of a preferred embodiment of the Smart Schema portion of the present invention.

The Object Schema Generator allows a user to define object classes and generate the corresponding IDL (Interface Definition Language). The Relational Schema Generator allows the user to define relational tables and generate the corresponding tables in the selected databases. The Schema Mapper allows the user to define a mapping between the relational schema and the object schema. FIG. 7 shows the main screen 700 for Smart Schema. The user may select one of the Smart Schema components by clicking on the appropriate icon, icon 710 to select the Relational Schema Generator, icon 720 to select the Object Schema Generator, or icon 730 to select the Schema Mapper.

2.1. Object Schema Generator

Figure 8:
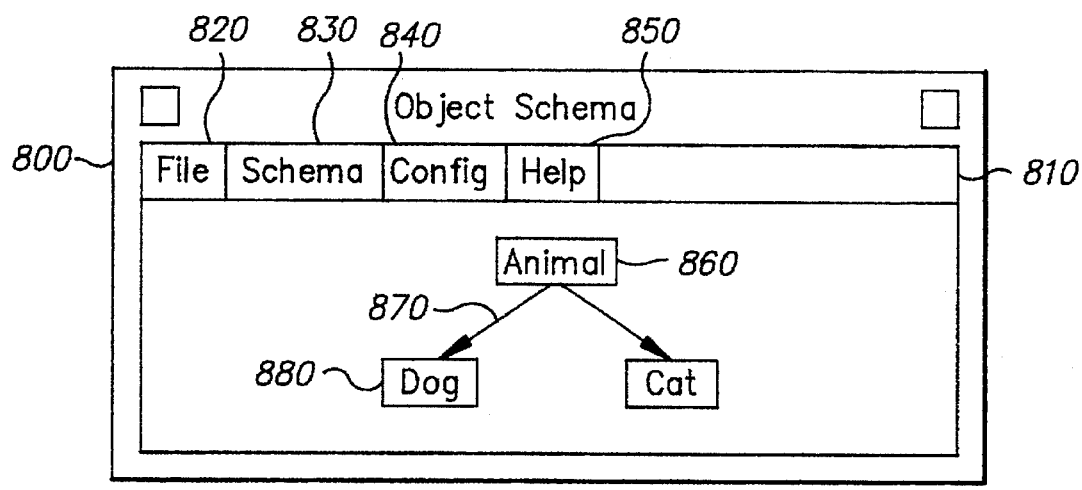

If the user selects the Object Schema Generator icon 720, then the Object Schema Generator Window 800 shown in FIG. 8 is displayed. The Object Schema Generator allows the user to define new classes. The user may define attributes, methods, types, and inheritance by clicking and keying in text information. When the user has completed such a definition, the user may request the Object Schema Generator to generate the IDL for the class or classes which the user has defined.

Within the Object Schema Generator Window 800, a menu bar 810 is displayed containing selectable menu items,
File 820, Schema 830, Config. 840, and Help 850. The user may select one of the menu items to display a corresponding pulldown menu. The pulldown menus display and allow the user to select the following functions:

File 820
  Close—exit Object Schema Generator and return to Smart Schema main screen
  quit—exit Smart Schema
Schema 830
  Add class—add a new class
  Add subclass—add inheritance relationship between classes
  Select classes—select existing IDLs and display them on the screen
Config 840
  Directory—specify the directory for the generated IDL file. The default is the current directory.
  Makefile—generate a makefile for all the classes on the diagram.

In addition, when the user clicks on a class, such as the class Animal 860, a popup menu appears with the following menu items:

Class—use this item to change the name of the class or delete the class from the screen.
  Attributes—use this item to add or change attributes
  Types—use this item to add or change types
  Methods—use this item to add or change methods
  Generate—use this item to generate IDL for the class If the user desires to delete an inheritance relationship, such as the inheritance relationship 870 between class Animal 860 and its subclass Dog 880, the user may click on the relationship 870, and select a Delete menu item on a popup menu that appears.

Object schema defined by use of the Smart Schema Object Schema Generator are specified based on the Object Definition Language (ODL) defined in the ODMG-93 Standard (R. G. G. Cattell (Ed), The Object Database Standard: ODMG-93, Morgan Kaufmann Publishers, San Mateo, Calif., 1994). ODL is a superset of the Interface Definition Language (IDL) defined in CORBA (The Common Object Requester Broker Architecture and Specification, OMG TC Document 91.12.1, 1991.). As such, it is also a superset of the Data Definition Language (DDL) defined in the OMG Object Persistence Service Specification (IBM/JOSS Object Services Persistence Service Specification, OMG TC Document 93.5.7, Nov. 15, 1993).

Table 1 lists and describes the data types defined in ODL. These are identical to the ones defined in IDL, which is a subset of ODL.

2.2. Relational Schema Generator

Figure 9:
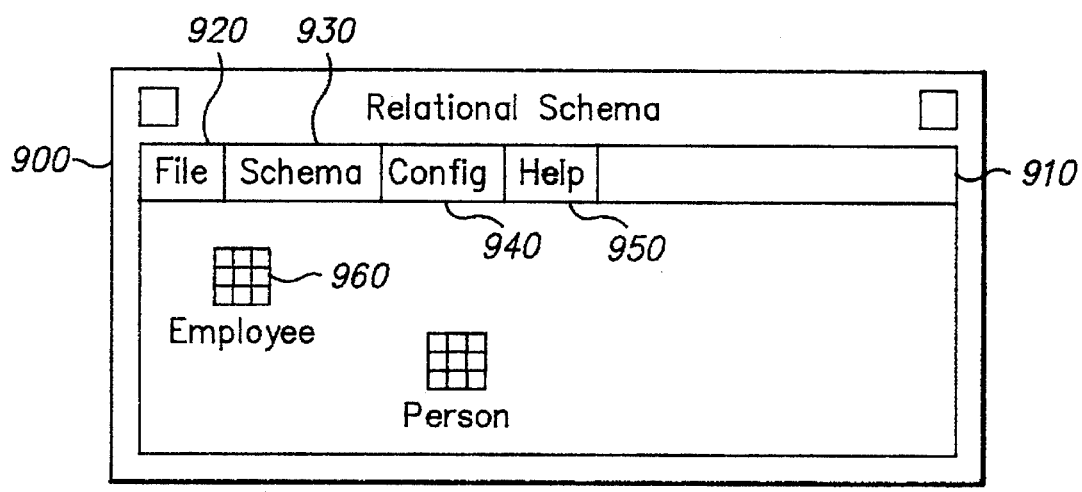

Referring now back to FIG. 7, if the user selects the Relational Schema Generator icon 710, then the Relational Schema Generator Window 900 shown in FIG. 9 is displayed. The Relational Schema Generator allows the user to define relational schema such as new relational tables and views. The user may define columns, keys, join conditions, and other relational items by clicking and keying in text information. When the user has completed such a relational definition, the user may create the table or view in the selected database.

Within the Relational Schema Generator Window 900, a menu bar 910 is displayed containing selectable menu items, File 920, Schema 930, Config 940, and Help 950. The user may select one of the menu items to display a corresponding pulldown menu. The pulldown menus display and allow the user to select the following functions:

File 920
　close—exit Relational Schema Generator and return to Smart Schema main window
　quit—exit Smart Schema
Schema 930
　Add Table—add a new table
　Select Tables—this shows a list of databases and tables on the selected system.
　Add View—add a new view
Config 940
　Displays a list of the available relational database systems accessible by the user so that the user may select a particular relational database system, i.e., IBM DB2/2 or IBM DB2/6000 for example. Depending upon the relational database system selected, or not selected, in which case a default is used, the Relational Schema Generator may display a list of databases and tables provided by the selected relational database system.

In addition, when the user clicks on a table or a view, such as the Employee table 960, a popup menu appears with the following menu items:
　Table/View—use this item to change the name of the table/view or delete the table/view from the screen.
　Create—use this item to create the table/view in the database
　Drop—use this item to drop the table/view from the database
　Show SQL—show the SQL statement for creating/dropping the table Relational schema defined by use of the Smart Schema Relational Schema Generator are specified based on the IBM Structured Query Language (SQL) defined in the IBM SQL Reference Version 1, First Edition, August 1993.

Table 2 lists and describes the data types defined in SQL.

2.3. Schema Mariner

This section specifies the external design of the Schema Mapper which provides object to data store schema mapping. The design is intended to be general, particularly on the object side, such that it applies to all types of data stores. For the purposes of describing the following preferred embodiment of the Schema Mapper, mappings between relational data stores or other types of data stores which support a relational API (e.g., X/Open CLI or ODBC) and objects are presented; however, the design allows tailoring, particularly on the data store side, for each specific type of data store.

For a relational to object mapping, i.e., to materialize tulles into objects, the Schema Mapper must be able to represent the tuples in an object schema. In the Schema Mapper:
　each table is represented as an interface type,
　each column is represented as an attribute, and
　each row is represented as an object.

For an object to relational mapping, i.e., to store objects in a relational data store, the Schema Mapper must be able to represent the objects in a relational schema. In the Schema Mapper:
　each interface type is represented as a table,
　each attribute is represented as a column, and
　each object is represented as a row.

Figure 10:
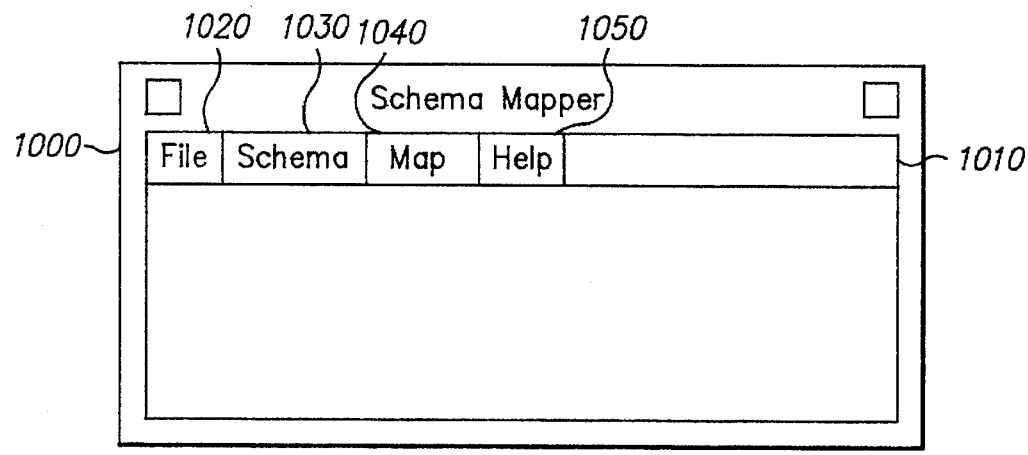

Referring now back to FIG. 7, if the user selects the Schema Mapper icon 730, then the Schema Mapper Window 1000 shown in FIG. 10 is displayed. The Schema Mapper allows the user to define a mapping between a relational schema and an object schema. The Schema Mapper supports the following mapper configurations:
　Table to Class
　　1 table to 1 class
　　1 table to many classes
　　many tables to 1 class
　Class to Table
　　1 class to 1 table
　　1 class to many tables
　　many classes to 1 table
　Column to Attribute
　　1 column to 1 attribute
　　1 column to many attributes
　　many columns to 1 attribute
　Attribute to Column
　　1 attribute to 1 column
　　1 attribute to many columns
　　many attributes to 1 column In addition, Schema Mapper supports the following four scenarios depending upon if the table exists or not, and depending upon if the class exists or not:
1. Classes and Tables both exist; in which case, the user may define the mapping between them.
2. Classes exist but not Tables; in which case, the user may select the existing classes, define the mapping from the existing classes to the tables, and then create the corresponding tables.
3. Tables exist but not Classes-; in which case, the user may select the tables, define the mapping from the existing tables to the classes, and then generate the corresponding IDLs.
4. Both Classes and Tables do not exist; in which case, the user may use the Object Schema Generator or the Relational Schema Generator to define either or both schema. After that, the user may follow one of the above three steps to define mappings.

When the user has completed defining the mapping between tables and classes, the user may capture the mapping configuration by generating a Schema Mapping Definition Language (SMDL) description of the mapping.

Referring again to FIG. 10, within the Schema Mapper Window 1000, a menu bar 1010 is displayed containing selectable menu items, File 1020, Schema 1030, Map 1040, and Help 1050. The user may select one of the menu items to display a corresponding pulldown menu. The pulldown menus display and allow the user to select the following functions:
　File 1020
　　New—clear the current screen and start over again.
　　Open—open existing SMDL files and display the mapping information on the screen. This allows the user to modify mapping information.
　　Close—exit Schema Mapper and return to Smart Schema main window.
　　Quit—exit Smart Schema
　Schema 1030
　　Select classes—select existing classes from either the Interface Repository or to the IDL file.
　　Select tables—select existing tables from selected relational database system.
　Map 1040
　　Link—indicates mapping relationship between schema.
　　Generate SMDL—generates SMDL corresponding to the mapping between the schema.

The operation of the Schema Mapper supporting the above four scenarios, depending upon if the table exists or not, and depending upon if the class exists or not, will now be discussed.

2.3.1. Schema Mapper Scenario 1: Classes and Tables Both Exist

For the scenario where the classes and tables both exist, six additional scenarios are presented: three scenarios in which existing table(s) are mapped to existing class(es), and three scenarios in which existing class(es) are mapped to existing table(s). For the mapping of existing table(s) to existing class(es), the three scenarios presented are mapping one existing table to one existing class, mapping one existing table to two existing classes, and mapping many existing tables to one existing class. For the mapping of existing class(es) to existing table(s), the three scenarios presented are mapping one existing class to one existing table, mapping one existing class to two existing tables, and mapping many existing classes to one existing table.

2.3.1.1 Mapping One Existing Table to One Existing Class

Figure 11:
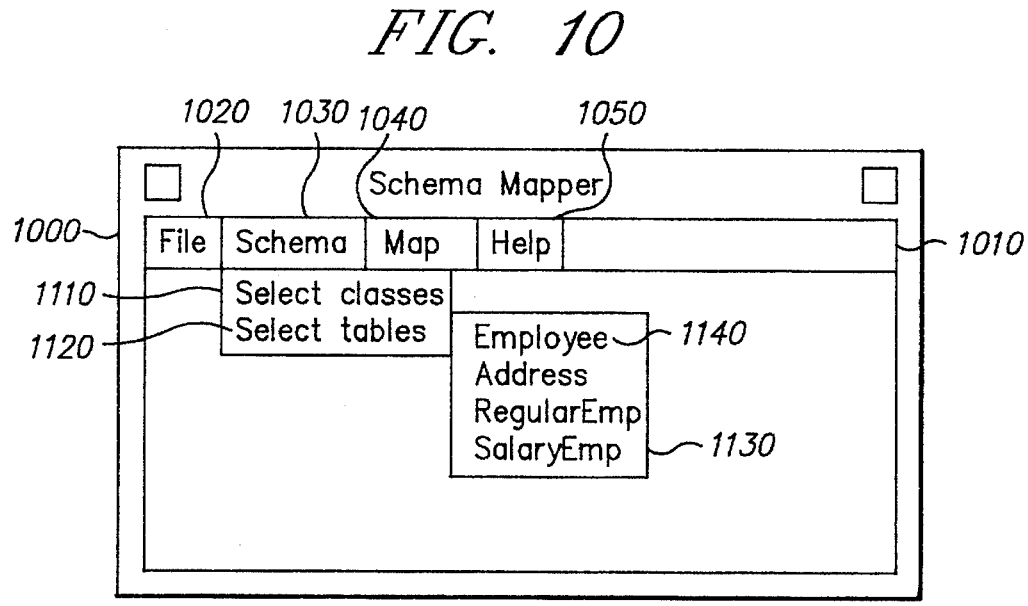
Figure 12:
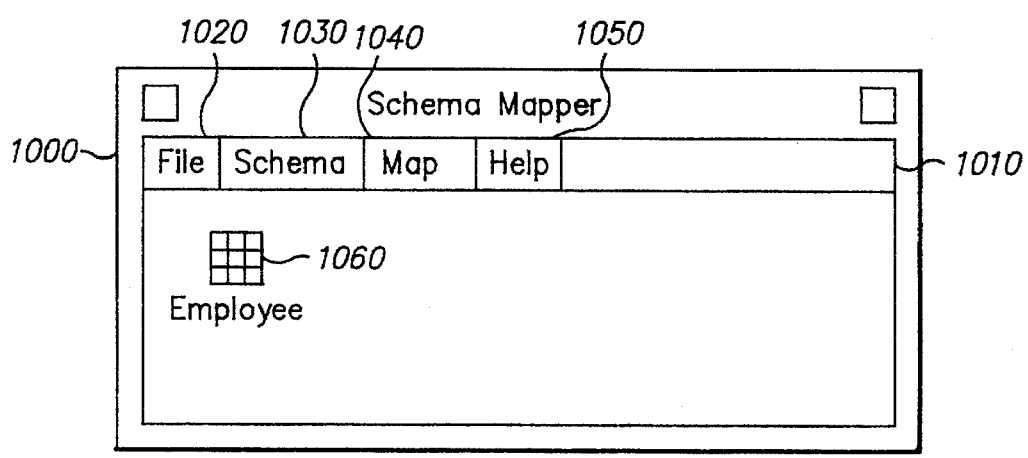

In this scenario, the user selects an existing table Employee and an existing class Person. Referring back to FIG. 10, the user selects the existing table Employee by clicking on the Schema menu item 1030 from the menu bar 1010. Referring now to FIG. 11, from a subsequently displayed Schema pulldown menu 1110, the user clicks on the Select Tables item 1120 which displays a listbox 1130 listing existing tables from which the user may select. The user may then click on Employee 1140 within the listbox to select the Employee table. This causes the Employee table icon 1060 to be displayed within the Schema Mapper Window 1000 as illustrated in FIG. 12.

Figure 13:
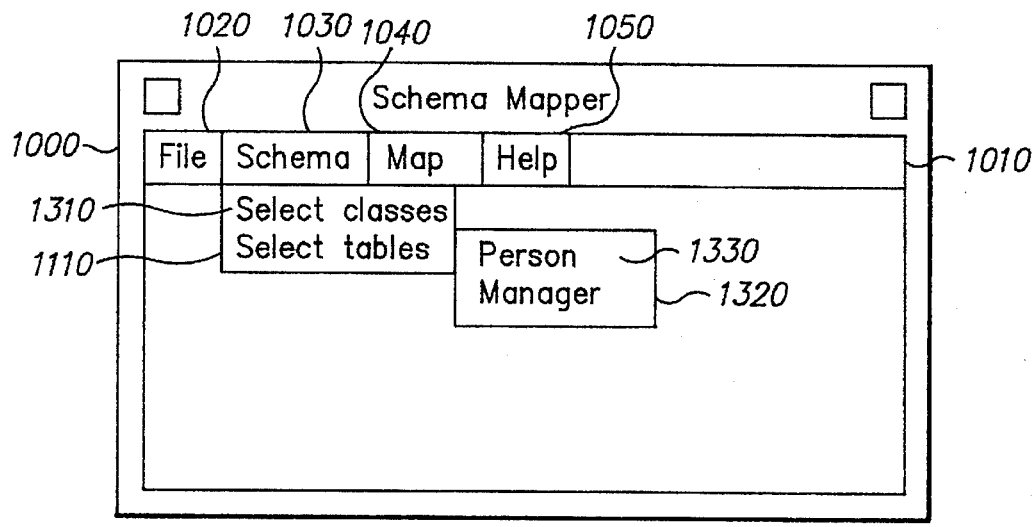
Figure 14:
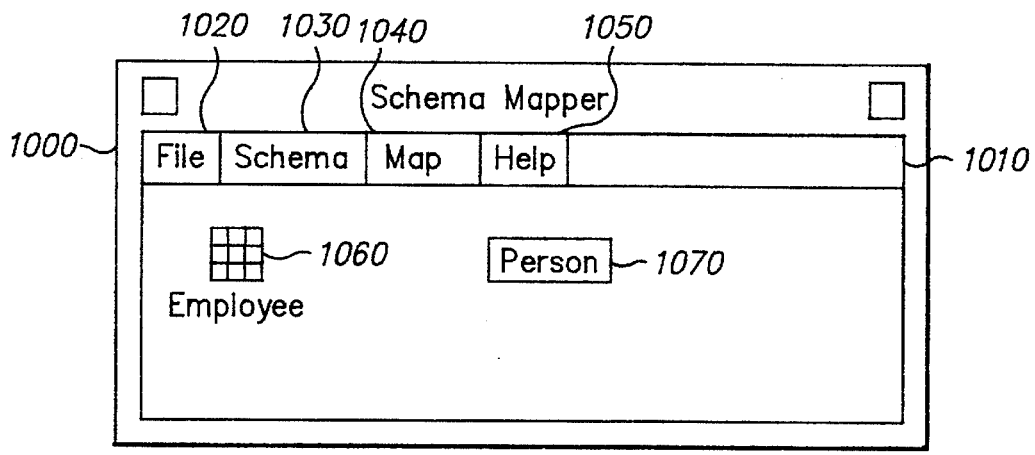

To select the existing class Person, the user follows a similar process. Referring now to FIG. 13, the user clicks on the Schema menu item 1030 from the menu bar 1010. From a subsequently displayed Schema pulldown menu 1110, the user clicks on the Select Classes item 1310 which displays a listbox 1320 listing existing classes from which the user may select. The user may then click on Person 1330 within the listbox to select the Person class. This causes the Person class icon 1070 to be displayed within the Schema Mapper Window 1000 as illustrated in FIG. 14.

Figure 15:
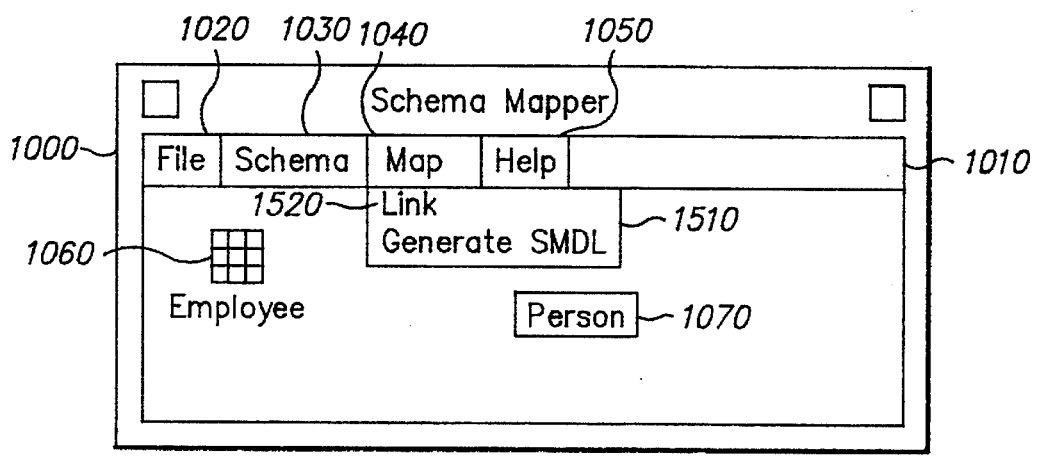
Figure 16:
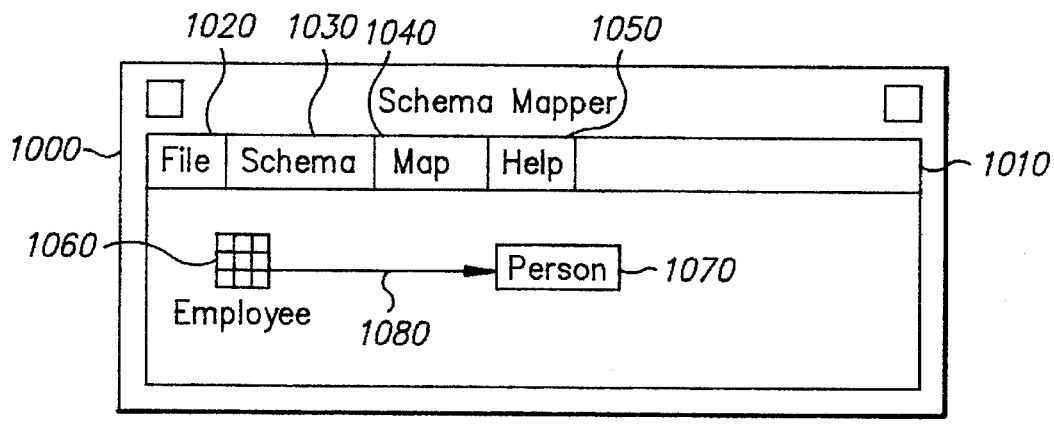

Referring now to FIG. 15, to define a mapping between the existing Employee table and the existing Person class, the user clicks on the Map menu item 1040 from the menu bar 1010. From a subsequently displayed Map pulldown menu 1510, the user clicks on the Link item 1520, and then the user clicks on the Employee table icon 1060 and the Person class icon 1070 to indicate that the Employee table and Person class are linked, i.e., that the Employee table schema will be mapped to the Person class schema. To indicate this link, a link arrow icon 1080 is drawn between the Employee table icon 1060 and the Person class icon 1070 as illustrated in FIG. 16.

Figure 17:
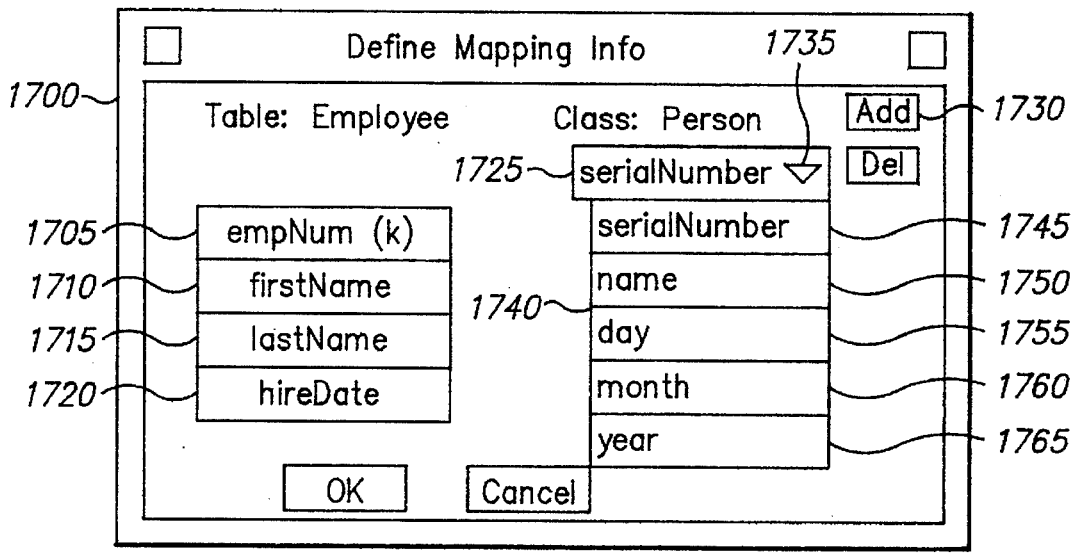

The user may then click on the arrow icon 1080 to indicate that the user wishes to define the mappings between the Employee table columns and the Person class attributes. After the user clicks on the arrow icon 1080, a Define Mapping Info Window 1700 is displayed as illustrated in FIG. 17. The Employee table column names 1705, 1710, 1715, and 1720 are displayed on the left hand side of the Define Mapping Info Window 1700. A Combo box 1725 that contains all the attributes of the Person class is shown on the right hand side of Define Mapping Info Window 1700. The user may then specify which Employee table columns map to which Person class attributes. To specify a mapping, the user clicks on the Add icon 1730; clicks on the Employee table column name to be mapped, for example, empNum(k) 1705; clicks on the Combo box list button 1735 to display a listbox 1740 containing a list of the Person class attributes (serialNumber 1745, name 1750, day 1755, month 1760, and year 1765); and then clicks on the Person class attribute name to be mapped, for example, serialNumber 1745. This results in the selected Employee table column name being mapped to the selected Person class attribute, for example, empNum(k) being mapped to serialNumber. The user may repeat this process to define other column to attribute mappings.

For the cases where a column maps to more than one attribute or where many columns map to one attribute, a user exit function may be defined. A user exit function allows the user to specify user defined mapping functions.

Figure 18:
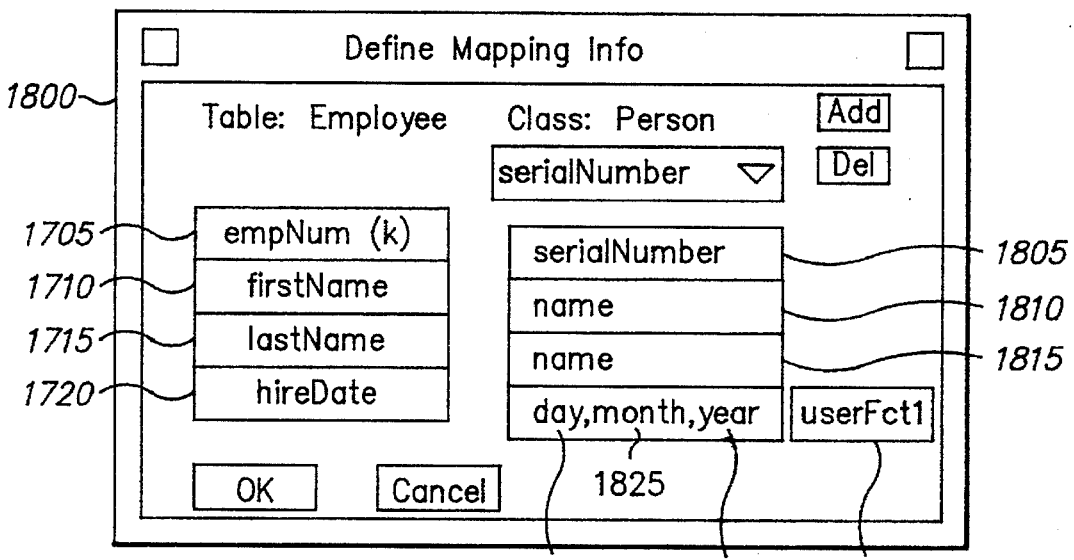

Referring now to FIG. 18, a subsequent Define Mapping Info Window 1800 resulting from such a process of user specified mappings is shown. The Define Mapping Info Window 1800 displays the table column to class attribute mappings. The table column empNum(k) 1705 is mapped to the class attribute serialNumber 1805. The table columns firstName 1710 and LastName 1715 are mapped to the class attribute name 1810 and 1815. In this example, the user, or did not define an exit function, and the default implementation concatenates the two columns firstName 710 and LastName 1715. The table column hireDate 1720 is mapped to three class attributes: day 1820, month 1825, and year 1830, and an user exit function is provided which the user defined by selecting the userFctl button 1875.

To represent tuples in an object schema, each data type in the relational schema must map to an equivalent data type in the object schema. In addition to mapping table columns to class attributes, the: Schema Mapper also maps the table data types to attribute data types. By default, a default SQL data type to ODL data type mapping is provided. This default mapping is specified in Table 5. In an alternative embodiment, the user may also override the default datatype conversion for any particular table column datatype to class attribute datatype. In such an alternative embodiment, the default datatypes may be displayed in addition to the table column to class attribute mapping. The user may click on the default datatype to display a listbox of allowable datatypes from which the user may select by clicking to override the default datatype. The allowable override mappings from which the user may select are specified in Table 4. In still another alternative embodiment, the user may click on the table column or class attribute to display a details listbox containing the default datatype. The user may then click on the default datatype to display a listbox of allowable datatypes from which the user may select by clicking to override the default datatype.

2.3.1.2 Mapping One Existing Table to Two Existing Classes

Figure 19:
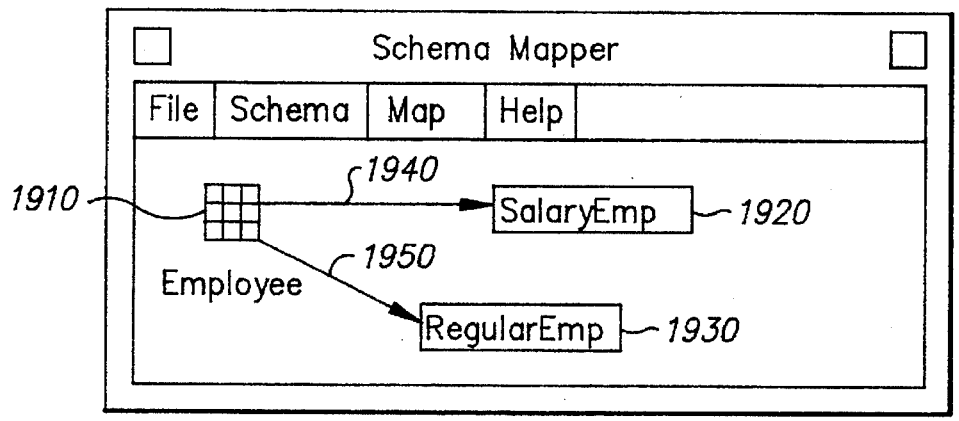

Referring now to FIG. 19, in this scenario, the user wants to map one existing table Employee 1910 to two existing classes: SalaryEmp 1920 and RegularEmp 1930. Similar to the above scenario, the user selects the table and the classes, and then defines the links between them.

The user then clicks on the link arrow 1940 between table Employee 1910 and class SalaryEmp 1920. A screen similar to FIG. 17 is displayed for mapping the Employee table columns to the class SalaryEmp attributes. The user then defines the column to attribute mapping from the Employee table to the SalaryEmp class in the same manner as described above.

The user then repeats the above process for the Employee to RegularEmp link arrow 1950.

2.3.1.3 Mapping Many Existing Tables to One Existing Class

Figure 20:
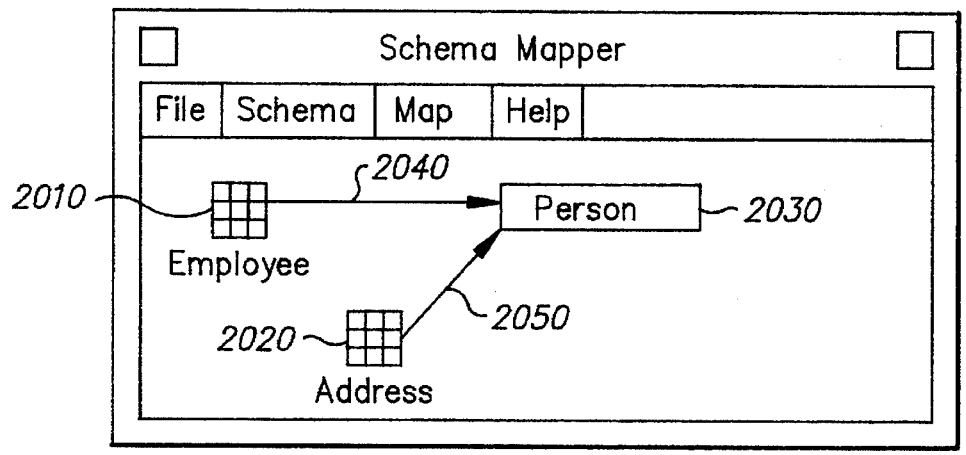

Referring now to FIG. 20, in this scenario, the user wants to map many existing tables to one existing class. For example, the user may map table Employee 2010 and table Address 2020 to the class Person 2030. The user is provided with two alternative processes for specifying such a mapping.

Under the first alternative, the user may define a view on the many tables. The user may then specify the join conditions between the tables and the output columns in the view. Then, the user may map the view table to the class. In effect, this is similar to the above Mapping One Existing Table to One Existing Class Scenario where one table (one view table) is mapped to one class. The user may first use the Relational Schema Generator to define the view on the many tables. The user may then follow the above Mapping One Existing Table to One Existing Class Scenario to define the mapping between the view table columns and the class attributes.

Under the second alternative, the user may select multiple tables, define join and conditions between the tables, and then map to a class. An advantage of this second alternative is that it does not require a view table to be defined. Referring again to FIG. 20, the user links the table Employee 2010 and the class Person 2030 yielding link arrow 2040. Next the user links the table Address 2020 and the class Person 2030 yielding link arrow 2050. In this particular case, clicking on each link arrow, 2040 or 2050, and defining the columns to attributes mapping is not sufficient because joins or conditions may need to be specified. Therefore, in this case, the user is required to first draw all the m-1 links (link arrows 2040 and 2050), then click on the target (the class Person 2030), and then specify mapping. This process allows the Schema Mapper to recognize that a join or condition clause may be necessary and to prompt the user for such join or condition clause.

2.3.1.4 Mapping One Existing Class to One Existing Table

Figure 21:
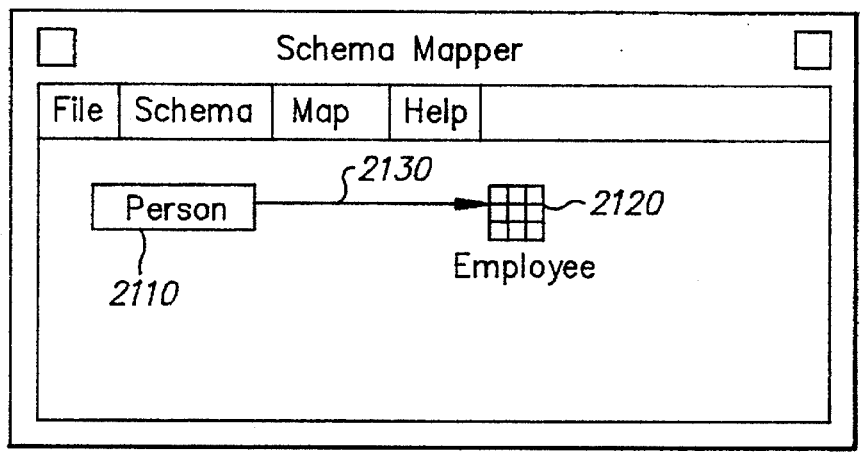
Figure 22:
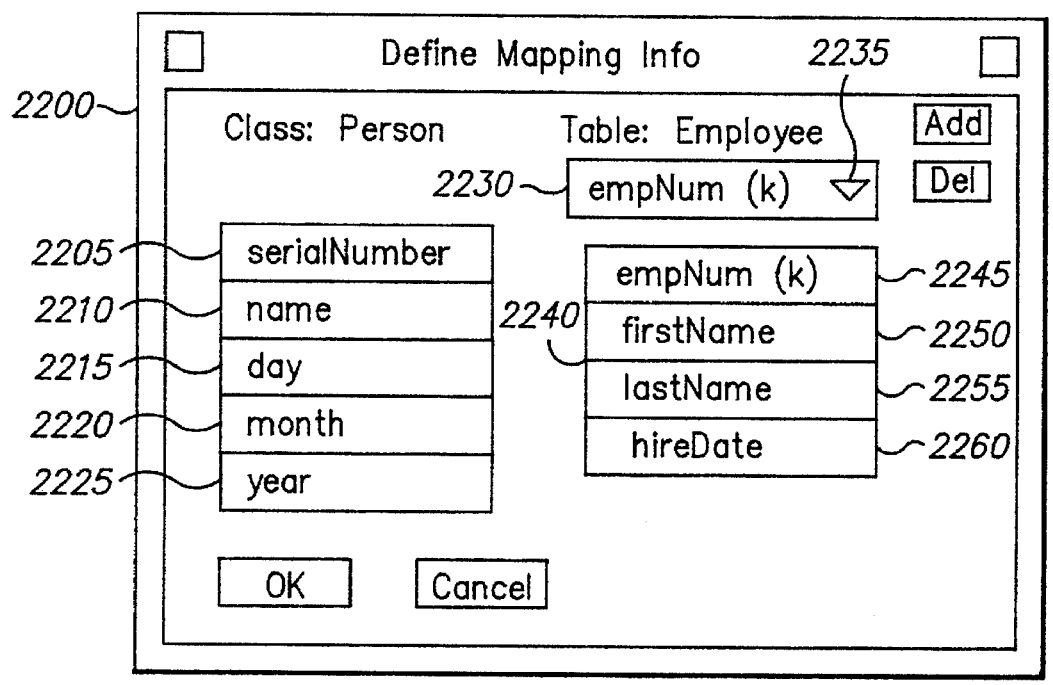

Referring now to FIG. 21, in this scenario, the user wants to map an existing class Person 2110 to an existing table Employee 2120. When the user clicks on the link arrow 2130 between the class Person 2110 and the table Employee 2120, the Define Mapping Info Window of FIG. 22 is displayed.

On the left hand side of the Define Mapping Info Window 2200, the Person class attribute names (serialNumber 2205, name 2210, day 2215, month 2220, and year 2225) are displayed. A Combo box 2230 that contains all the columns of the table Emmployee is shown on the right hand side of the Define Mapping Info Window 2200. The user may click on the Combo box list button 2235 to display a listbox 2240 containing a list of the Employee table columns (empNum 2245, firstName 2250, lastName 2255, and hireDate 2260). Similar to the table to class mapping described above, the user may then select which attribute to map to which column. For the cases where an attribute maps to more than one column or where many attributes map to one column, a user exit function may be defined.

Figure 23:
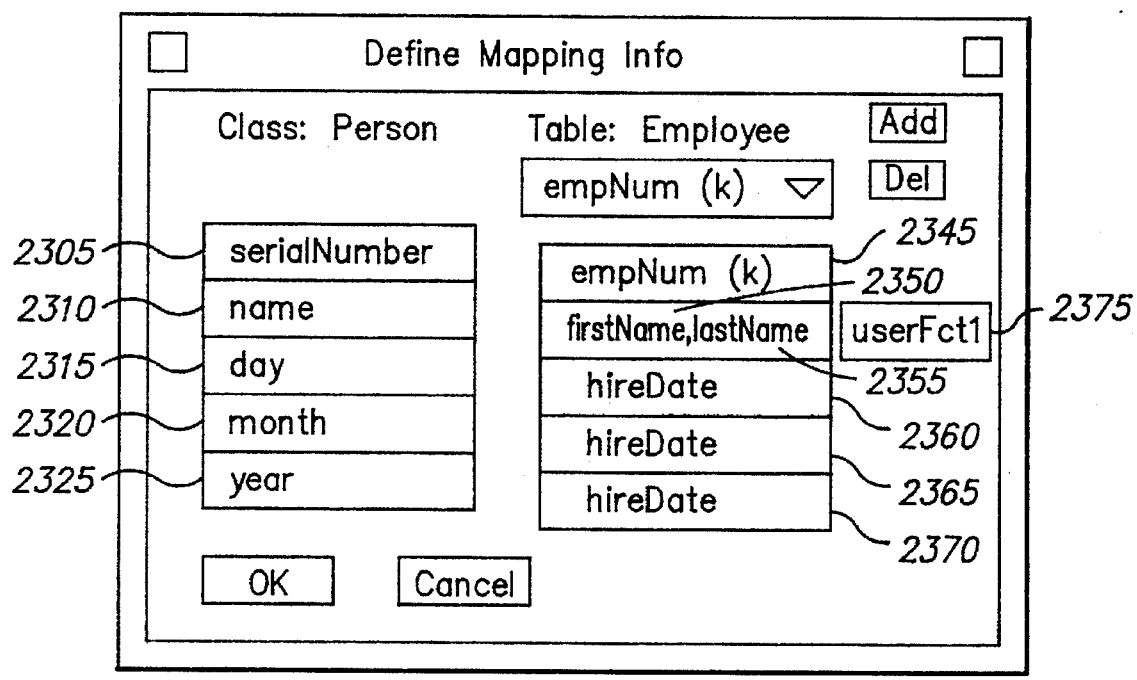

Referring now to FIG. 23, the results of such a class attributes to table columns mapping is illustrated. The attribute serialNumber 2305 is mapped to the columns empNum 2345. The attribute name 2310 is mapped to the columns firstName 2350 and LastName 2355. An exit function may be defined by selecting the userFctl button 2375 to specify how the attribute name 2310 is split into the two columns firstName 2350 and LastName 2355. The three attributes: day 2315, month 2320, and year 2325 are mapped to the one column hireDate 2360, 2365, and 2370. Since an exit function is not provided by the user in this case, the default implementation concatenates the three attributes values.

As part of representing objects in a relational schema, one must map each data type in the object schema to an equivalent data type in the relational schema. In addition to mapping class attributes to table columns, the Schema Mapper also maps the attribute data types to table column data types. By default, a default ODL data type to SQL data type mapping is provided. This default mapping is specified in Table 6. The allowable override datatype mappings from which the user may select are specified in Table 3.

2.3.1.5 Mapping One Existing Class to Two Existing Tables

Figure 24:
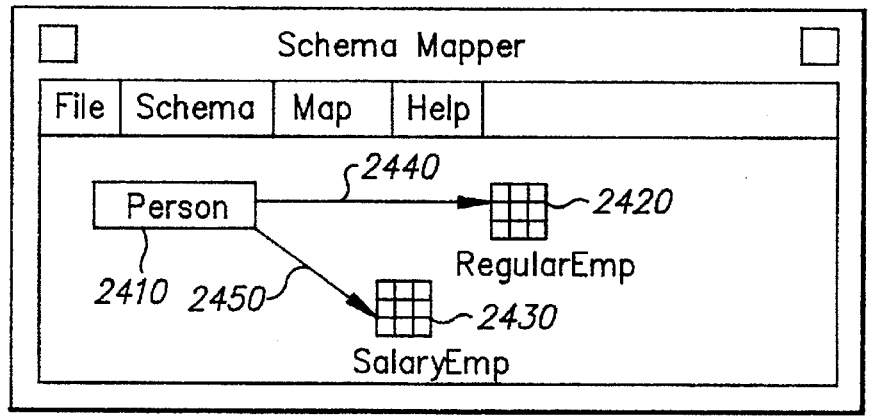

Referring now to FIG. 24, in this scenario, the user wants to map one existing class Person 2410 to two existing tables: SalaryEmp 2420 and RegularEmp 2430. The user may click on the link arrow 2440 between the class Person 2410 and table RegularEmp 2420 to display a window for mapping attributes to columns similar to the Define Mapping Info Window 2200 of FIG. 22. The user may then define the attribute to column mapping from the class Person 2410 to the table RegularEmp 2420. The user may then repeat the above process for the Person to SalaryEmp link arrow 2450.

2.3.1.6 Mapping Many Existing Classes to One Existing Table

Figure 25:
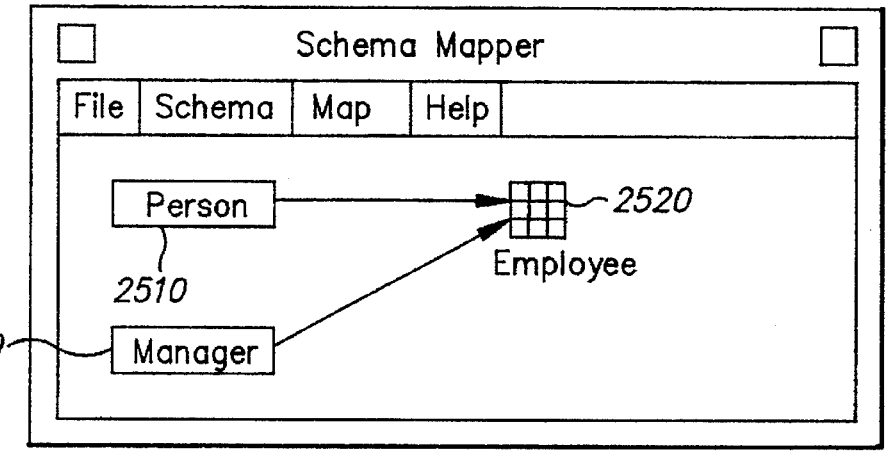

Referring now to FIG. 25, in this scenario, the user wants to map many existing classes to one existing table. This situation may arise in an inheritance hierarchy where the user wants to map all the attributes that are inherited into one table. Alternatively, the user may want to map multiple classes to one existing table even though the classes do not have any relationship to each other. The user may perform the process of the above described Mapping One Existing Class to One Existing Table on the class Person 2510 and table Employee 2520. The user may then repeat this process on the class Manager 2530 and table Employee 2520. Although this scenario also falls into the more difficult m-1 scenarios, this scenario is simpler than the many tables to one class scenario as there is no need to specify joins or conditions.

2.3.2 Schema Mapper Scenario 2: Classes Exist, But Not Tables

For the scenario where the class(es) exist, but not the table(s), three additional scenarios are presented: mapping one existing class to one new table, mapping one existing class to many new tables, and mapping many existing classes to one new table.

2.3.2.1 Mapping One Existing Class to One New Table

Figure 26:
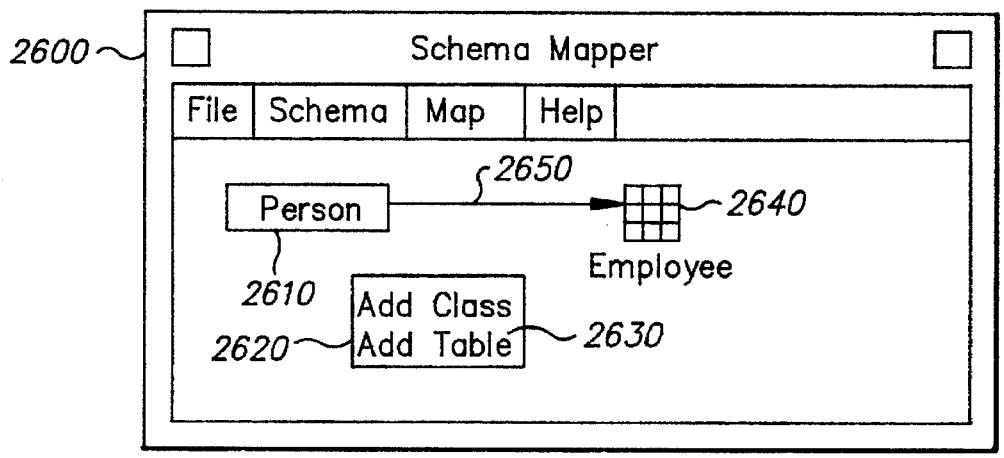

Referring now to FIG. 26, in this scenario, the user selects an existing class Person 2610 and defines the corresponding table for the class. The user clicks on the class Person icon 2610, and a popup menu 2620 appears where the user may click on an "Add Table" menu item 2630 to add a new table. As a result of clicking the "Add Table" menu item 2630, the user is prompted for a name for the new table via a prompt dialog. After the user enters the new table name into the prompt dialog, a table icon, the Employee table icon 2640, is added to the Schema Mapper Window 2600 with a link arrow 2650 between the class Person icon 2610 and the table Employee icon 2640.

The new table contains the default column mappings for the attributes in the class. If the user wishes to override the default datatype mappings, the user may override them as described above. When the user is satisfied with the mapping, the user may request that the new table be created in the specified database repository. In an alternative embodiment, when a new table for a class is created, an extra column is created in the new table to store a PID (Persistent Identifier uniquely identifying a row in the table). This extra column is of type CHAR, and is used by the run-time to handle various situations, including use as a primary key to uniquely identify an object's OID (Object Identifier) to the PID of a row in a table.

2.3.2.2 Mapping One Existing Class to Many New Tables

Referring again to FIG. 26, in this scenario, the user selects an existing class Person 2610 and defines multiple tables for the class. This is similar to the last scenario. The user clicks on the class Person icon 2610 to display the popup menu 2620 from which the user selects the "Add Table" menu item 2630, and then follows the last scenario as described above. The user then repeats this process as needed for each new table. The user defines the columns in each new table, and when satisfied, creates each new table in the database repository. Note that the user has to be sensitive to the order of table creation if there are dependencies between the new tables.

2.3.2.3 Mapping Many Existing Classes to One New Table

In this scenario, the user selects many existing classes and defines mappings to one new table. This is similar to the many existing classes to one existing table scenario, except that the new table needs to be created.

2.3.3. Schema Mapper Scenario 3: Tables Exist, But Not Classes

For the scenario where the table(s) exist, but not the class(es), three additional scenarios are presented: mapping one existing table to one new class, mapping one existing table to many new classes, and mapping many existing tables to one new class.

2.3.3.1 Mapping One Existing Table to One New Class

Figure 27:
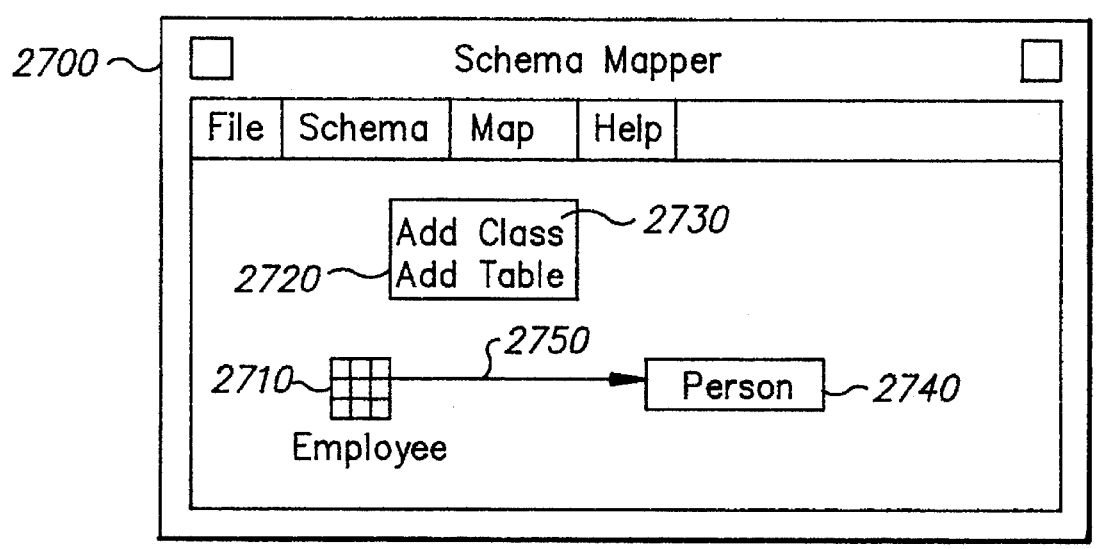

Referring now to FIG. 27, in this scenario, the user selects an existing table Employee 2710 and defines the corresponding class. The user clicks on the table Employee icon 2710, and a popup menu 2720 appears wherein the user may click on an "Add Class" menu item 2730 to add a new class. When the user clicks on the "Add Class" menu item 2730, the user is prompted to enter a name for the new class via a prompt dialog. When the user enters the new class name, a class icon, the class Person icon 2740, is added to the Schema Mapper Window 2700 with a link arrow 2750 between the table Employee icon 2710 and the new class Person icon 2740.

The new class Person contains the default attribute mappings for the columns in the table Employee. If the user wishes to override the default mappings, the user may do so as described above. When the user is satisfied with the mapping, the user may request that the IDL for the class be generated and stored in the selected object repository.

2.3.3.2. Mapping One Existing Table to Many New Classes

Referring again to FIG. 27, in this scenario, the user selects an existing table Employee 2710 and defines multiple new classes for the table. This is similar to the last scenario. The user clicks on the class Person icon 2710 to display the popup menu 2720 from which the user selects the "Add Class" menu item 2730, and then follows the last scenario as described above. The user then repeats this process as needed for each new class. The user may define the attributes in each new class, and when satisfied, generate IDL for each new class.

2.3.3.3 Mapping Many Existing Tables to One New Class

In this scenario, the user selects many existing tables and defines mappings to one new class. This is similar to the mapping many existing tables to one existing class scenario except that the new class first needs to be generated.

2.4 Modifying Existing Schema Mappings

The Schema Mapper allows a user to change existing schema mappings. The Schema Mapper displays existing SMDL files on the screen, and allows the user to modify the SMDL, and then regenerate the SMDL files. The SMIR provides APIs to retrieve the internal format. These APIs may also be used to retrieve information from existing SMDL files.

2.5 Schema Mapper graphical Mapping Semantics

In this section, the various mapping semantics supported graphically in Schema Mapper are discussed. The mapping semantics correspond to those that are supported in SMDL. In other words, any semantics that are defined by the SMDL may be specified graphically using the Schema Mapper.

2.5.1 Schema Icons

The Schema Mapper uses different icons to represent different schema. The following are the three icon categories:

class icon representing a class,
table icon representing a table, and
relationship table icon representing a relationship table.
The relationship table icon has a different appearance from that of the table icon, and is used to visually indicate that two or more tables are being related by the represented relationship table. This is indicated by displaying a visual indicator from the relationship table icon, containing the primary keys, to each of the tables containing the foreign keys to which the primary keys relate.

Each category is further divided into two cases:
schema exist, and
schema does not exist.

Different semantic information is displayed for different icons. For example, for a non-existent table icon, there will be a Create option to allow the user to create a new table.

2.5.2 Join

A "Join" is meaningful when:
multiple tables are mapped to one class, or
one class is mapped to multiple tables.
When either of these condition arise, the context menu for the class icon will show the "join" menu item. The user may select this item to define the joins between the tables. Then a Join Window allows the user to choose which table columns on which to join. After the join is defined, a Define Mapping Info Window similar to 2200 of FIG. 22 is displayed for mapping attributes to the columns resulting from the join. The user may then define the class attribute to join column mapping.

2.5.3 Union

A "Union" is meaningful when:
multiple tables are mapped to one class, or
one class is mapped to multiple tables.
When either of these condition arise, the context menu for the class icon will show the "Union" menu item. The user may Select this item to define the unions between the tables. The Union Window allows the user to choose which tables from which this class will collect data.

2.5.4 Condition

A "Condition" is meaningful when:
one class is mapped to one table,
one class is mapped to multiple tables,
many classes are mapped to one table,
one table is mapped to one class,
one table is mapped to multiple classes, or
multiple tables are mapped to one class.
When one of these conditions arise, the context menu for the class icon will show the "Condition" menu item. The-user may select this item to define the conditions for filtering data from the relational tables.

2.5.5 OrderBy

An "OrderBy" is meaningful when:
one class is mapped to one table,
one class is mapped to multiple tables,
many classes are mapped to one table,
one table is mapped to one class,
one table is mapped to multiple classes, or
multiple tables are mapped to one class.
When one of these conditions arise, the context menu for the class icon will show the "Order By" menu item. The user may select this item to define the order by clause. An Order By Window allows the user to choose which table columns to order the results by and in what order (ascending versus descending).

2.5.6 Super Join

A super join refers to the situation where a join is defined between tables mapped to the selected class and tables mapped to a parent class (superclass) of the selected class (subclass). A super join menu item appears on popup menu displayed when the user clicks on the class icon. Selecting this super join menu item displays a super join dialog allowing the user to choose which tables, of those tables mapped to a parent class of the class, on which to perform a join with tables mapped to the class. Once the user has selected the superclass tables and subclass tables upon which to perform a join, a Join Window allows the user to choose which table columns on which to join. Thereafter, the user proceeds the same as for a join.

2.5.7 Direct References

A direct reference refers to the situation wherein a class contains an attribute that references another class, and the user wishes to map this reference using a foreign key and primary key relation in the relational data store. The foreign key and primary key relation can be either direct from one table to another (Direct Reference) or indirect through a third table known as a relationship table (Indirect Reference). When an attribute is a reference, then a Reference icon is displayed to indicate to the user that the user has to map either "Direct" or "Indirect ". If the user chooses "Direct", a Direct Reference dialog is displayed. The Direct Reference dialog fallows the user to verify that the mapping uses a column that is a foreign key from the From table, and that relates to a primary key in the To table.

2.5.8 Indirect References (via Relationship Table)

When the user selects "Indirect" from the above discussed Reference icon to map the reference attribute using an Indirect Reference, then the user is presented with a First Indirect Reference dialog allowing the user to choose which relationship table to use. After selecting the relationship table, a Second Indirect Reference dialog is displayed allowing the user to choose the To column from the relationship table.

3. Schema Mapping Internal Representation (SMIR)

The following example illustrates a sample schema mapping definition. There are two classes in the Object Store: employee and department. Corresponding to these two classes, there are three tables in the relational database repository: employee, address, and department. The schema definition of the classes, the schema definition of the tables, the schema mapping definition between the tables and classes (expressed in SMDL), and a Schema Mapping Internal Representation data structure are presented.

The definition of the two classes (the object schema), employee and department, are as follows:

```
\begin{verbatim}
    class rich_employee
        {
        public:
            char empno[100];
            int salary;
            char name[100];
            char address[200];
            department * dept;
        }
    class department
        {
        public:
            char deptno[100];
            char deptname[100];
            os_Set <rich_employee *> employee;
        }
\end{verbatim}
```

The definition of the three tables (the data store schema) in the relational database corresponding to the above two classes are as follows:

```
\begin{verbatim}
    table employee
            column eno -- string
            column name -- string
            column salary -- real
            column dependent -- integer
            column workdept -- sting
    table address
            column eno -- string
            column address -- string
    table department
            column dno -- string
            column dname -- string
            column manager -- string
\end{verbatim}
```

The schema mapping between the above classes and tables expressed in SMDL is as follows:

```
\begin{verbatim}
# This is schema mapping definition for employee-department
# classes
SCHEMA_MAPPING employee-department
    # class
    CLASS rich_employee
        JOIN "employee.eno = address.eno"
        CONDITION "salary > 400100 order by lastname desc"
        ATTRIBUTE empno
            ATTRIBUTE_TYPE string
            TABLE employee
            COLUMN eno
            TYPE string
        END_ATTRIBUTE
        ATTRIBUTE salary
            ATTRIBUTE_TYPE real
            TABLE employee
            COLUMN salary
            TYPE real
        END_ATTRIBUTE
        ATTRIBUTE name
            ATTRIBUTE_TYPE string
            TABLE employee
            COLUMN name
            TYPE string
        END_ATTRIBUTE
        ATTRIBUTE address
            ATTRIBUTE_TYPE string
            TABLE address
            COLUMN address
            TYPE string
        END_ATTRIBUTE
    END_CLASS
    # class
    CLASS department
        ATTRIBUTE deptno
            ATTRIBUTE_TYPE string
            TABLE department
            COLUMN deptno
            TYPE string
        END_ATTRIBUTE
        ATTRIBUTE deptname
            ATTRIBUTE_TYPE string
            TABLE department
            COLUMN deptname
            TYPE string
        END_ATTRIBUTE
    END_CLASS
    # relationship
    RELATIONSHIP dept
        FROM 1
            FROM_CLASS rich_employee
            FROM_ATTRIBUTE dept
            FROM_ATTRIBUTE_TYPE department*
            FROM_TABLE employee
            FROM_COLUMN workdept
            FROM_COLUMN_TYPE string
        TO n
```

-continued

```
            TO_CLASS department
            TO_ATTRIBUTE employee
            TO_ATTRIBUTE_TYPE dept *
            TO_TABLE department
            TO_COLUMN dno
            TO_COLUMN_TYPE string
    END_RELATIONSHIP
END_SCHEMA_MAPPING
\end{verbatim}
```

The following is an example of a data structure representing a Schema Mapping Internal Representation (SMIR) in which the above object schema, data store schema, and the mapping of the object schema and the data store schema may be stored:

Schema Mapping Internal Representation (C++ classes)
DbSchemaMapping
DbStore
DbTable
DbColumn
DbClass
DbAttr
DbReference
DbSchemaMapping class
char*DbSchemaMapping_getName();
DbStore*DbSchemaMapping_getDatastore();
DbStore*DbSchemaMapping_getNextDatastore();
DbClass*DbSchemaMapping_getClass();
DbClass*DbSchemaMapping_getNextClass();
DbReference*DbSchemaMapping_getReference();
DbReference*DbSchemaMapping_getNextReference();
DbTable*DbSchemaMapping_getTable();
DbTable*DbSchemaMapping_getNextTable();
void DbSchemaMapping_setName(char*mappingname);
void DbSchemaMapping_setDatastore(DbStore*store);
void DbSchemaMapping_setNextDatastore (DbStore*store);
void DbSchemaMapping_setClass(DbClass*newclass);
void DbSchemaMapping_setNextClass (DbClass*newclass);
void DbSchemaMapping_setReference(DbReference*rel);
void DbSchemaMapping_setNextReference (DbReference*rel);
void DbSchemaMapping_setTable(DbTable*newtable);
void DbSchemaMapping_setNextTable (DbTable*newtable);
DbStore*DbSchemaMapping_findDatastore (char*storename)
DbClass*DbSchemaMapping_findClass (char*classname);
DbTable*DbSchemaMapping_findTable (char*tablename);
DbReference*DbSchemaMapping_findReference (char*refname);
char*DbStore_getName();
char*DbStore_getDbmsType();
char*DbStore_getDbName();
char*DbStore_getUserId();
char*DbStore_getPassword();
void DbStore_setName(char*storename);
void DbStore_setDbmsType (char*dbmsname);
void DbStore_setDbName (char*dbname);
void DbStore_setUserId (char*username);
void DbStore_setPassword (char*passwd);
DbTable Class
char*DbTable_getName();
DbClass*DbTable_getClass();
DbClass*DbTable_getNextClass();
DbColumn*DbTable_getColumn();
DbColumn*DbTable_getNextColumn();
void DbTable_setName(char*tabname);
void DbTable_setClass(DbClass*cp);
void DbTable_setNextClass(DbClass*cp);
void DbTable_setColumn(DbColumn*colp);
void DbTable_setNextColumn(DbColumn*colp);
DbColumn class
char*DbColumn_getName();
int DbColumn_getType();
DbTable*DbColumn_getTable();
DbAttr*DbColumn_getAttr();
DbAttr*DbColumn_getNextAttr ();
void DbColumn_setName (char*colname);
void DbColumn_setType(int coltype);
void DbColumn_setTable(DbTable*tp);
void DbColumn_setAttr(DbAttr*ap);
void DbColumn_setNextAttr(DbAttr*ap);
DbClass class
char*DbClass_getName();
DbClass*DbClass_getSuperclass();
char*DbClass_getSuperjoin();
char*DbClass_getJoin();
char*DbClass_getCondition();
char*DbClass_getOrderBy();
DbStore*DbClass_getStore();
DbTable*DbClass_getTable();
DbTable*DbClass_getNextTable();
DbAttr*DbClass_getAttr();
DbAttr*DbClass_getNextAttr();
DbAttr*DbClass_getNextSplitAttr();
DbColumn*DbClass_getKey();
DbColumn*DbClass_getNextKey();

void DbClass_setName(char*classname);
void DbClass_setSuperclass(DbClass*superclass);
void DbClass_setSuperjoin(char*jointext);
void DbClass_setJoin(char*jointext);
void DbClass_setCondition(char*conditiontext);
void DbClass_setOrderBy(char*orderbytext);
void DbClass_setStore(DbStore*dbstorep);
void DbClass_setTable(DbTable*tabp);
void DbClass_setNextTable(DbTable*tabp);
void DbClass_setAttr(DbAttr*attr);
void DbClass_setNextAttr(DbAttr*attr);
void DbClass_setNextSplitAttr(DbAttr*attr);
void DbClass_setKey(DbColumn*keyp);
void DbClass_getNextKey(DbColumn*keyp);
DbAttr class
char*DbAttr_getName();
int DbAttr_getType();
char*DbAttr_getFunction();
DbClass*DbAttr_getClass();
DbColumn*DbAttr_getColumn();
DbColumn*DbAttr_getNextColumn();
DbReference*DbAttr_getReference();

void DbAttr_setName(char*attrname);
void DbAttr_setType(int attrtype);
void DbAttr_setFunction(char*func);
void DbAttr_setClass(DbClass*cp);
void DbAttr_setColumn(DbColumn*colp);
void DbAttr_setNextColumn(DbColumn*colp);
void DbAttr_setReference(DbReference*referp);
DbReference class
char*DbReference_getName();
// from class
DbClass*DbReference_getFrom();
DbAttr*DbReference_getFrattr();
DbTable*DbReference_getFrtable();
DbTable*DbReference_getNextFrtable();
DbColumn*DbReference_getFrcolumn();
DbColumn*DbReference_getNextFrcolumn();
DbTable*DbReference_getFrreltable();
DbColumn*DbReference_getFrrelcolumn();

DbColumn*DbReference_getNextFrrelcolumn();
// to class
DbClass*DbReference_getTo();
DbTable*DbReference_getTotable();
DbTable*DbReference_getNextTotable();
DbColumn*DbReference_getTocolumn();
DbColumn*DbReference_getNextTocolumn();
DbTable*DbReference_getToreltable();
DbColumn*DbReference_getTorelcolumn();
DbColumn*DbReference_getNextTorelcolumn();
void DbReference_setName (char*relname);
// from class
void DbReference_setFrom(DbClass fromclass);
void DbReference_setFrattr (DbAttr attrp);
void DbReference_setFrtable(DbTable*frtabp);
void DbReference_setNextFrtable(DbTable*frtabp);
void DbReference_setFrcolumn(DbColumn*frcolp);
void DbReference_setNextFrcolumn(DbColumn*frcolp);
void DbReference_setFrreltable(DbTable*frreltabp);
void DbReference_setFrrelcolumn(DbColumn*frrelcolp);
void DbReference_setNextFrrelcolumn (DbColumn*frrelcolp);
// to class
void DbReference_setTo(DbClass*toclass);
void DbReference_setTotable(DbTable*totabp);
void DbReference_setNextTotable(DbTable*totabp);
void DbReference_setTocolumn(DbColumn*tocolp);
void DbReference_setNextTocolumn(DbColumn*tocolp);
void DbReference_setToreltable(DbTable*toreltabp);
void DbReference_setTorelcolumn(DbColumn*torelcolp);
void DbReference_setNextTorelcolumn (DbColumn*torelcolp);

4. Schema Mapping Definition Language (SMDL)

4.1. Introduction

The system 100 includes a schema mapping definition language (SMDL) generator 220 which generates, from the internal data structure, a high level language (SMDL) 230 which represents the mapping.

This section describes the functional specification and relevant information of the Schema Mapping Definition Language (SMDL). SMDL is the base for both the textual schema mapping definition and the graphical user interface (GUI) schema mapping definition. The SMDL describes how Schema are mapped in a textual format. The Schema Mapper component of Smart Schema generates SMDL for the user so that the user does not have to learn a new language. Because the SMDL is in a textual format, it is completely portable. A parser is provided to translate the SMDL into SMIR (Schema Mapping Internal Representation). The SMIR is used by both the GUI schema mapping and run-time accessing the data store or object store.

SMDL is designed to provide a schema mapping syntax that reduces the amount of work for the user and reduces the complexity of the schema mapping definition. The syntax is also designed to be easily extensible.

A schema mapping definition describes how object schema and relational schema are mapped to each other. The object data model consists of interfaces, attributes, inheritance, etc.; whereas, the relational data model consists of tables, columns, joins, etc. There are similarities and differences between these two data models. In SMDL, the similarities are mapped directly, while the differences are mapped using a specially created mapping syntax.

4.2. SMDL Grammar

The Schema Mapping Definition Language style is declarative and uses direct mapping based on key words. There are no intermediate models or constructs involved. The user sees only the object data model and the relational database model, and deals only with the constructs (interfaces and tables) in question. This strategy reduces the amount of work for the user, reduces the complexity of the schema mapping definition, and increases the extensibility of the mapping syntax.

The following is a high level description of the SMDL text grammar for schema mapping to map between relational database schema and object-oriented database schema.

One SMDL file has one schema mapping definition.
Schema mapping definition name must be unique.
Only binary relationships are supported.
The SMDL flow begins with the schema mapping name and narrows the scope with each mapping construct. Within a schema mapping, there is connectivity information, classes and references.

A class keyword defines its name, join condition, and its attributes.

An attribute defines its type, table and column name, whether or not it is a primary key or allows nulls.

A reference keyword defines its name, cardinality, to and from table and column names.

The following is a high level description of the SMDL text semantics for schema mapping to map between relational database schema and object-oriented database schema.

Schema Mapping name must be specified in mapping definition.

Each statement starts with a keyword and has only one keyword.

All keywords must be upper class characters.

All the class definitions are followed by all the reference definitions.

Attribute definitions start with the keyword ATTRIBUTE and end with keyword END_ATTRIBUTE.

Class definition starts with the keyword CLASS, embeds all attribute definitions, and ends with the keyword END_CLASS.

Reference definitions start with the keyword REFERENCE and end with keyword END_REFERENCE.

Schema mapping definition is the highest level of the mapping definition. It starts with the keyword SCHEMA_MAPPING and embeds all class and reference definitions.

indentation helps identify the hierarchy of the schema mapping definition, but it is now required.

The line starting with '#' character is handled as a comment line.

4.3. SMDL Constructs

The following sections describe the major language constructs provided in SMDL and the purpose of each construct. An example is given for each construct.

4.3.1. Comment

A comment starts with the # sign. Comments are line-based and can appear any where. A comment looks like the following:

This is a comment line.

4.3.2. Blank Lines

Blank lines are allowed to increase the readability of the schema mapping definition. Blank lines may appear anywhere, and they are ignored by the SMDL parser.

4.3.3. Defining The Schema Mapping

A schema mapping definition starts with the keyword SCHEMA_MAPPING followed by the schema mapping name. The schema mapping name should be unique within a DatastoreMgr. A schema mapping definition ends with the keyword END_SCHEMA_MAPPING. The syntax is as follows:

SCHEMA_MAPPING schema_mapping_name
 # Schema mapping definition
END_SCHEMA_MAPPING

4.3.4. Defining The Datastore Connection

The datastore connection specifies the connection information for connecting to the relational datastore. The datastore connection should appear before the interface mapping definitions.

The datastore connection starts with the keyword DATASTORE_ID followed by the datastore identifier, or datastore id, which is used for connecting to a datastore. The datastore id should be unique within the schema mapping definition.

The required arguments in the datastore connection are: datastore type and datastore name. All other arguments are optional and, if present, serve as default connection parameters. These optional arguments include: user_name and authentication.

Each argument starts with a keyword followed by the argument value. The syntax for the datastore connection definition is as follows:

```
DATASTORE_ID my_ds_id
    DATASTORE_TYPE db2/6000
    DATASTORE_NAME my_ds_name
    USER_NAME my_name
    AUTHENTICATION abcde
END_DATASTORE_ID
```

4.3.5. Mapping Interfaces To Tables or Views

In the interface mapping definition, no distinction is made between tables and views. That is, tables are used to mean both tables and views.

The mapping between interfaces and tables is m-n, which means one interface may map to one or more tables, and one or more interfaces may map to one table. SMDL supports three cases:

One interface maps to one table

One interface maps to multiple tables

Multiple interfaces map to one table

The first case of mapping one interface to one table is a straight forward definition. The second case of mapping one interface to multiple tables requires a join clause. Both of these cases involve a single interface mapping definition. The last case of mapping multiple interfaces to one table is accomplished through multiple interface mapping definitions and by duplicating the table information in each interface mapping definition.

The interface mapping definition includes the following information:

Scope of data manipulation and query for complex objects. A complex object is one which references other objects. The list of attribute names must be of interface type.

Datastore id, which represents the connection information for the datastore

Table name, or table names in case the interface maps to multiple tables

Key column names, which together uniquely identify the persistent data and which are used in the generation of the data_id attribute for PID Key column types Join condition, required only if the interface maps to multiple tables Selection condition to restrict the set of tuples to be considered for each table, optional Order By clause to order the result set of tuples, optional The syntax for the interface mapping definition is as follows:

```
INTERFACE interface_name
    SCOPE attribute_name_1, attribute_name_2, . . .,
    attribute_name_l
    DATASTORE_ID my_ds_id
    TABLE table_name_1, table_name_2, . . ., table_name_m
    KEY column_name_1, column_name_2, . . .,
    column_name_n
    KEY_TYPE column_type_1, column_type_2, . . .,
    column_type_n
    JOIN "join condition"
    SELECTION" filter condition"
    ORDERBY "order by clause"
    #
    # begin attribute mapping definition
    # . . .
    # end attribute mapping definition
    #
END_INTERFACE
```

4.3.6. Mapping Attributes To Columns

In the attribute mapping definition, no distinction is made between columns and statistical columns (columns derived from other columns). That is, columns are used to mean both columns and statistical columns.

The mapping between attributes and columns is m-n, which means one attribute may map to one or more columns and one or more attributes may map to a column. SMDL supports three cases:

One attribute maps to one column

One attribute maps to multiple columns

Multiple attributes map to one column

The first case of mapping one attribute to one column is a straight forward definition. The second and third cases require that user defined mapping functions be specified to accomplish the appropriate mapping. These two cases as well as the user defined mapping functions are explained below in Section 4.3.10 ("User Defined Mapping Functions").

The attribute mapping definition includes the following information:

Attribute type

Table name, required only if the interface maps to multiple tables

Column name

Column type

The syntax for the attribute mapping definition is as follows:

```
ATTRIBUTE attribute_name
    ATTRIBUTE_TYPE attr_type
    TABLE table_name
    COLUMN column_name
    COLUMN_TYPE col_type
END_ATTRIBUTE
```

4.3.7. Mapping References Among Interfaces

The mapping of references among interfaces, i.e. attributes of interface types, is defined using separate reference mapping definitions. For each reference, this involves two steps.

First, a user specifies the reference name in the attribute mapping definition. The syntax for doing is as follows:

```
ATTRIBUTE attribute_name
    ATTRIBUTE_TYPE interface_name
    REFERENCE_NAME ref_name
END_ATTRIBUTE
```

Second, the user specifies the reference mapping definition as described in the following section 3.3.7.1 ("Defining the Reference Mapping").

4.3.7.1. Defining The Reference Mapping

The information used for defining the reference mapping comes from the foreign key to primary key relationship as this relationship appears in the relational datastore. This foreign key to primary key relationship may appear directly from the source table(s) which contains the foreign key, to the target table(s) which contains the primary key. Alternatively, this relationship may appear indirectly through a relationship table. The direct foreign key to primary key relationship may represent a 1-1 relationship or 1-m relationship, but an indirect relationship table may represent an m-n relationship.

A major benefit of reference mapping is that, since the foreign key to primary key relationship as it appears in the relational datastore is used, referential integrity may be maintained in the relational datastore. Referential integrity means that every foreign key in a table must refer to an existing key in the related table, or it must be NULL, which means that it does not refer to any key in any table.

4.3.7.2. Defining The Direct Reference Mapping Without A Relationship Table

The direct reference mapping definition includes the following information:

Source interface name

Source attribute name

Source table names, which must be a subset of the table names which appear in the source interface mapping definition Source column names, the number and sequence of which must match with the those of the key column names of the target interface mapping definition Source column types, the number and sequence of which must match with those of the source column names Target interface name The syntax of the direct reference mapping is as follows:

```
REFERENCE reference_name
    FROM_INTERFACE interface_name
    FROM_ATTRIBUTE attribute_name
    FROM_TABLE table_name_1, table_name_2, ...,
    table_name_m
    FROM_COLUMN column_name 1, column_name_2, ...,
    column_name_n
    FROM_COLUMN_TYPE column_type_1, column_type_2,
    ..., column_type_n
    TO_INTERFACE interface_name
END_REFERENCE
```

4.3.7.3. Defining The Indirect Reference Mapping With A Relationship Table

The indirect reference mapping definition in this case includes the following information:

Source interface name

Source attribute name

Source relationship table name

Source relationship column names, the number and sequence of which must match with those of the key column names of the source interface mapping definition Source relationship column types, the number and sequence of which must match with those of the source relationship column names Target interface name Target relationship table name, which is the same as the source relationship table name Target relationship column names, the number and sequence of which must match with those of the key column names of the target interface mapping definition Target relationship column types, the number and sequence of which must match with those of the target relationship column names The indirect reference mapping syntax is as follows:

```
REFERENCE reference_name
    FROM_INTERFACE interface_name
    FROM_ATTRIBUTE attribute_name
    REL_TABLE table_name
    REL_COLUMN column_name_1, column_name_2, ..., column_name_m
    REL_COLUMN_TYPE column_type_1, column_type_2, ..., column_type_m
    TO_INTERFACE interface_name
    REL_TABLE table_name
    REL_COLUMN column_name_1, column_name_2, ..., column_name_n
    REL_COLUMN_TYPE column_type_1, column_type_2, ..., column_type_n
END_REFERENCE
```

4.3.8. Union, Intersection, and Difference

Union, intersection, and difference may be used in schema mapping. If the user wants to collect data into the same collection from a set of different tables, the union function may be used. For example, the employee tables are split into several geographical areas and mapped into one class by using the union syntax below. These three operations (union, intersection, and difference) have a similar schema mapping syntax.

4.3.8.1. Union For Class Mapping

The desired keyword, either UNION, INTERSECTION, or DIFFERENCE, is substituted for "UNION" in the syntax as follows:

```
\begin{verbatim}
CLASS class_name
    JOIN "join syntax"
    CONDITION "condition syntax"
    ATTRIBUTE attribute_name
    ATTRIBUTE_TYPE attribute_type
    TABLE table_name (or view_name)
    COLUMN column_name (or statistical_column_name)
    (, column_name [for multiple columns])
    TYPE column_type
    PRIMARY_KEY (yes or no)
    PRIMARY_KEY_SEQ sequence_number
    DEFAULT_NULL_VALUE default_null_value
    END_ATTRIBUTE
    ATTRIBUTE attribute_name2
    ATTRIBUTE_TYPE attribute_type
    TABLE table_name (or view_name)
    COLUMN column_name (or statistical_column_name)
    (, column_name [for multiple columns])
    TYPE column_type
    PRIMARY_KEY (yes or no)
    PRIMARY_KEY_SEQ sequence_number
    DEFAULT_NULL_VALUE default_null_value
    END_ATTRIBUTE
UNION
    JOIN "join syntax"
    CONDITION "condition syntax"
    ATTRIBUTE attribute_name
    ATTRIBUTE_TYPE attribute_type
    TABLE table_name (or view_name)
    COLUMN column_name (or statistical_column_name)
    (, column_name [for multiple columns])
    TYPE column_type
    PRIMARY_KEY (yes or no)
    PRIMARY_KEY_SEQ sequence_number
```

```
        DEFAULT_NULL_VALUE default_null_value
    END_ATTRIBUTE
    ATTRIBUTE attribute_name2
    ATTRIBUTE_TYPT attribute_type
    TABLE table_name (or view_name)
    COLUMN column_name (or statistical_column_name)
        (, column_name [for multiple columns])
    TYPE column_type
    PRIMARY_KEY (yes or no)
    PRIMARY_KEY_SEQ sequence_number
    DEFAULT_NULL_VALUE default_null_Value
    END_ATTRIBUTE
END_CLASS
\end{verbatim}
```

In the above syntax, the user must repeat information while keeping it consistent; therefore, an alternative syntax may be provided. This alternative syntax emphasizes union (or intersection or difference) in the attribute instead of in the class. Again the desired keyword (UNION, INTERSECTION, or DIFFERENCE) may be substituted for the correct function in the syntax as follows:

```
\begin{verbatim}
CLASS class_name
    JOIN "join syntax"
    ATTRIBUTE attribute_name
    ATTRIBUTE_TYPE attribute_type
    TABLE table_name (or view_name)
    COLUMN column_name (or statistical_column_name)
        (, column_name [for multiple columns])
    TYPE column_type
    UNION
    TABLE table_name (or view_name)
    COLUMN column_name (or statistical_column_name)
        (, column_name [for multiple columns])
    TYPE column_type
    END_ATTRIBUTE
END_CLASS
\end{verbatim}
```

In this alternative syntax, although the user does not have to repeat information, the user is not able to give a different join clause for each union.

4.3.8.2 Union For Reference Mapping

The syntax for union for reference mapping is as follows. Note that intersection and difference functions for reference/relationship mapping has no semantic meaning; therefore, only union is supported.

```
\begin{verbatim}
RELATIONSHIP relationship_name
    FROM reference_quantity (1 or n)
        FROM_CLASS class_name
        FROM_ATTRIBUTE attribute_name
        FROM_ATTRIBUTE_TYPE attribute_type
        FROM_TABLE table_name
        FROM_COLUMN column_name, column_name2, ...
        FROM_COLUMN_TYPE column_type,
            column_type2, ...
    TO reference_quantity (1 or n)
        TO_CLASS class_name
        TO_ATTRIBUTE attribute_name
        TO_ATTRIBUTE_TYPE attribute_type
        TO_TABLE table_name
        TO_COLUMN column_name, column_name2, ...
        TO_COLUMN_TYPE column_type, column_type2, ...
    UNION
    FROM reference_quantity (1 or n)
        FROM_CLASS class_name
        FROM_ATTRIBUTE attribute_name
        FROM_ATTRIBUTE_TYPE attribute_type
        FROM_TABLE table_name
        FROM_COLUMN column_name, column_name2, ...
        FROM_COLUMN_TYPE column_type,
            column_type2, ...
    TO reference_quantity (1 or n)
        TO_CLASS class_name
        TO_ATTRIBUTE attribute_name
        TO_ATTRIBUTE_TYPE attribute_type
        TO_TABLE table_name
        TO_COLUMN column_name, column_name2, ...
        TO_COLUMN_TYPE column_type, column_type2, ...
END_RELATIONSHIP
\end{verbatim}
```

An alternative syntax may also be provided. This alternative syntax emphasizes union in the attribute instead of in the reference/relationship.

```
\begin{verbatim}
REFERENCE reference_name
    FROM reference_quantity (1 or n)
        FROM_CLASS class_name
        FROM_ATTRIBUTE attribute_name
        FROM_ATTRIBUTE_TYPE attribute_type
        FROM_TABLE table_name
        FROM_COLUMN column_name, column_name2, ...
        FROM_COLUMN_TYPE column_type, column_type2, ...
    UNION
        FROM_TABLE table_name
        FROM_COLUMN column_name, column_name2, ...
        FROM_COLUMN_TYPE column_type, column_type2, ...
    TO reference_quantity (1 or n)
        TO_CLASS class_name
        TO_TABLE table_name
        TO_COLUMN column_name, column_name2, ...
        TO_COLUMN_TYPE column_type, column_type2, ...
END_REFERENCE
\end{verbatim}
```

The limitation of this alternative syntax is that it can not describe a mapping where the first part of the union uses a foreign key and primary key relation, while the second part of the union uses a relationship table.

4.3.9. Defining Inheritance Mapping

In the object-oriented model, a class inherits from its superclasses. The superclass is mapped to some tables like any other class, but the subclass needs only to map the attributes that are not part of its superclasses. Therefore, there is no need to repeat any part of the superclass mapping.

The keyword SUPER\_CLASS indicates the superclass inheritance for the subclass. If the user needs to join tables for the superclass and tables for the subclass, the keyword SUPER\_JOIN is used. The remaining part of the class mapping is same as a normal class.

```
\begin{verbatim}
CLASS class_name
    SUPER_CLASS superclass_name
    SUPER_JOIN "join syntax"
    JOIN "join syntax"
    ATTRIBUTE attribute_name
    ATTRIBUTE_TYPE attribute_type
    TABLE table_name (or view_name)
    COLUMN column_name (or statistical_column_name)
        (, column_name [for multiple columns])
        TYPE column_type
        END_ATTRIBUTE
    END_CLASS
\end{verbatim}
```

4.3.10. User Defined Mapping Functions

User defined mapping functions allow the user to code transformations for ENUMs and other types. They also provide a way for the user to split one column into multiple classes. SMDL supports three cases:

The function is applied to one attribute.
The function is applied to multiple attributes.
The function is applied to a reference/relationship.

4.3.10.1. An Exit Function For One Attribute

This exit function is applied to only one attribute; therefore, the exit function name is specified in the attribute mapping.

```
\begin{verbatim}
CLASS class_name
    JOIN "join syntax"
    ATTRIBUTE attribute_name
        ATTRIBUTE_TYPE attribute_type
        TABLE table_name (or view_name)
        COLUMN column_name (or statistical_column_name)
            (, column_name [for multiple columns])
        TYPE column_type
        EXIT_FUNCTION function_name
    END_ATTRIBUTE
END_CLASS
\end{verbatim}
```

4.3.10.2. An Exit Function For Multiple Attributes

If multiple data members map to one column, these data members are listed in the attribute list. The syntax for the multiple data member mapping is as follows:

```
\begin{verbatim}
ATTRIBUTE attribute_name1, attribute_name2, ...
    ATTRIBUTE_TYPE attribute_type1, attribute_type2, ...
    TABLE table_name (or view_name)
    COLUMN column_name (or statistical_column_name)
    TYPE column_type
END_ATTRIBUTE
\end{verbatim}
```

If the exit function is applied to these multiple attributes in a class, then the exit function is specified in the class mapping as follows:

```
\begin{verbatim}
CLASS class_name
    JOIN "join syntax"
    ATTRIBUTE attribute_name, attribute_name2, ...
        ATTRIBUTE_TYPE attribute_type, attribute_type2, ...
        TABLE table_name (or view_name)
        COLUMN column_name (or statistical_column_name)
        TYPE column_type
        EXIT_FUNCTION function_name
    END_ATTRIBUTE
END_CLASS
\end{verbatim}
```

Alternatively, an exit function may be specified for multiple attributes. In this case, the user may create a function for each attribute, and name the function in each attribute mapping using the syntax described for an exit function for one attribute.

4.3.10.3. An exit Function For A Reference

When the exit function is applied to a reference or a relationship, the exit function is specified in the reference or the relationship mapping as follows:

```
\begin{verbatim}
RELATIONSHIP relationship_name
    EXIT_REL_FUNCTION function_name
    FROM reference_quantity (1 or n)
        FROM_CLASS class_name
        FROM_ATTRIBUTE attribute_name
        FROM_ATTRIBUTE_TYPE attribute_type
        FROM_TABLE table_name
        FROM_COLUMN column_name, column_name2, ...
        FROM_COLUMN_TYPE column_type, column_type2, ...
        FROM_RELTABLE table_name
        FROM_RELCOLUMN column_name, column_name2, ...
        FROM_RELCOLUMN_TYPE column_type, column_type2, ...
    TO reference_quantity (1 or n)
        TO_CLASS class_name
        TO_ATTRIBUTE attribute_name
        TO_ATTRIBUTE_TYPE all_tribute_type
        TO_TABLE table_name
        TO_COLUMN column_name, column_name2, ...
        TO_COLUMNTYPE column_type, column_type2, ...
        TO_RELTABLE table_name
        TO_RELCOLUMN column_name, column_name2, ...
        TO_RELCOLUMN_TYPE column_type, column_type2, ...
END_RELATIONSHIP
\end{verbatim}
```

4.4. The BNF grammar of SMDL

The following is a Backus Normal Form (BNF) grammar description of the Schema Mapping Definition Language:

```
\input{grammar}
\begin{verbatim}
# schema mapping grammar
<SCHEMA_MAPPING>::<COMMENT_MAPPING_S>
SCHEMA_MAPPING schema_mapping_name
    <DATABASE_MAPPING_S>
    <CLASS_MAPPING_S>
    <REFERENCE_MAPPING_S>
<COMMENT_MAPPING_S>::<COMMENT_MAPPING_S> <COMMENT_MAPPING_S> ]
    <COMMENT_MAPPING>
<DATABASE_MAPPING_S>::<DATABASE_MAPPING_S> <DATABASE_MAPPING_S> ]
    <DATABASE_MAPPING> ] null ]
    <COMMENT_MAPPING_S>
<CLASS_MAPPING_S>::<CLASS_MAPPING_S> <CLASS_MAPPING_S> ]
    <CLASS_MAPPING> ] <COMMENT_MAPPING_S>
<REFERENCE_MAPPING_S>::
    <REFERENCE_MAPPING_S> <REFERENCE_MAPPING_S> ]
    <REFERENCE_MAPPING> ] null ] <COMMENT_MAPPING_S>
#comment grammar
<COMMENT_MAPPING>::#comment_line ] blank_line
# database grammar
<DATABASE_MAPPING>::DATASTORE database_name
    (<DATABASE_ARGUMENTS>)
    END_DATASTORE
<DATABASE_ARGUMENTS>::<DBMS_VALUE>
    <DB_VALUE>
    <CONNECTIVITY_VALUE>
    <ACCESSMETHOD_VALUE>
    <USERID_VALUE>
    <PASSWORD_VALUE>
<DBMS_VALUE>::DBMS dbms_value
<DB_VALUE>::DB db_value
<CONNECTIVITY_VALUE>::CONNECTIVITY connectivity_value
<ACCESSMETHOD_VALUE>::ACCESS accessmethod_value
<USERID_VALUE>::USER_ID user_id
<PASSWORD_VALUE>::PASSWORD password
#enumerate grammar
<ENUMERATE_MAPPING>::ENUMERATE enumerate_function_name
    (<ENUMERATE_ARGUMENTS>)
<ENUMERATE ARGUMENTS>::<REL_ENUM_VALUE_PAIR_S>,
    <CLASS_ARGUMENT>,<ENUM_TYPE_ARGUMENT>.
    <VALUE_TYPE_ARGUMENT>
<REL_ENUM_VALUE_PAIR_S>::<REL_ENUM_VALUE_PAIR_S>,<REL_ENUM
_VALUE_PAIR_S> ]
    <REL_ENUW_VALUE_PAIR>
<REL_ENUM_VALUE_PAIR>::relational_value,enuruvalue
<CLASS_ARGUMENT>::CLASS class_name
<ENUM_TYPE_ARGUMENT>::ENUM_TYPE enum_type
<VALUE_TYPE_ARGUMENT>::VALUE_type value_type
# class grammar
<CLASS_MAPPING>::CLASS class_name
        {<SUPERCLASS_MAPPING>}
        {<JOIN_VALUE>}
    (<DATAMEMBER_MAPPING_S>)
    END_CLASS
<SUPERCLASS_MAPPING>::<SUPERCLASS_NAMES>
    <SUPERJOIN_VALUE>
<SUPERCLASS_NAMES>::SUPER_CLASS superclass_name
<SUPERJOIN_VALUE>::SUPER_JOIN <JOIN_SYNTAX>
<JOIN_SYNTAX>::"join_syntax"
<JOIN_VALUE>::JOIN <JOIN_SYNTAX>
# data member grammar
<DATAMEMBER_MAPPING_S>::<DATAMEMBER_MAPPING_S>
<DATAMEMBER_MAPPING_S> ]
    <DATAMEMBER_MAPPING> ] <S_DATAMEMBER_MAPPING> ]
    <DUMMY_DATAMEMBER_MAPPING>
<DATAMEMBER_MAPPING>::ATTRIBUTE data_member_name
    <ATTRIBUTE_TYPE_VALUE>
    <TABLE_VALUE>
    <COLUMN_VALUE>
    <COLUMN_TYPE_VALUE>
    {<SEQUENCE_VALUE>}
    {<DEFAULT_VALUE>}
    {<EXIT_FUNCTION_VALUE>}
    END_ATTRIBUTE
<TABLE_MAPPING>::TABLE table_name
<COLUMN_S_MAPPING>::column_name ]
    (<COLUMN_NAMES> {, <PRIMARY_VALUE>} {, <SEQUENCE_VALUE>}
    {, <DEFAULT_VALUE>} {, <EXIT_FUNCTION_VALUE>})
<COLUMN_MAPPING>::COLUMN column_name
```

-continued

```
<COLUMN_NAMES>::=<COLUMN_NAMES>,<COLUMN_NAMES> ] column_name
<PRIMARY_VALUE>::=PRIMARY <PRIMARY_VALUE_NAME>
<PRIMARY_VALUE_NAME>::=yes ] no
<SEQUENCE_VALUE>::=SEQUENCE sequence_number
<DEFAULT_VALUE>::=DEFAULT default_value
<DEFAULT_FUNCTION>::=DEFAULT_FUNCTION default_function_name
<EXIT_FUNCTION_VALUE>::=FUNCTION exit_function_name
<REFERENCE_NAME>::=<REFERENCE_NAME> OR <REFERENCE_NAME> ]
    reference_name
<S_DATAMEMBER_MAPPING>::=<DATAMEMBER_NAMES>=<TABLE_MAPPING>.<COLUMN
N_MAPPING>
<DATAMEMBER_NAMES>::=<DATAMEMBER_NAMES>,<DATAMEMBER_NAMES> ]
    datamember_name
<DUMMY_DATAMEMBER_MAPPING>::=$$DUMMY$$=<TABLE_MAPPING>.<
COLUMN_MAPPING>
# reference grammar
<REFERENCE_MAPPING>::=REFERENCE relationship_name
    {<EXIT_FUNCTION_ARGUMENT>}
    <FROM_REFERENCE_ARGUMENTS>
    <TO_REFERENCE_ARGUMENTS>
    END_REFERENCE
<FROM_REFERENCE_ARGUMENTS>::=FROM reference_quantity
            <FROM_CLASS_ARGUMENT>
            <FROM_ATTRIBUTE_ARGUMENT>
            <FROM_ATTRIBUTETYPE_ARGUMENT>
            <FROM_TABLE_ARGUMENT>
            <FROM_COLUMN_ARGUMENT>
            <FROM_COLUMNTYPE_ARGUMENT>
            {<FROM_OPTIONAL_ARGUMENTS>}
<FROM_OPTIONAL_ARGUMENTS>::=<FROM_RELTABLE_ARGUMENT>
            <FROM_RELCOLUMN_ARGUMENT>
            <FROM_RELCOLUMNTYPE_ARGUMENT>
<TO_REFERENCE_ARGUMENTS>::=TO reference_quantity
            <TO_CLASS_ARGUMENT>
            <TO_ATTRIBUTE_ARGUMENT>
            <TO_ATTRIBUTETYPE_ARGUMENT>
            <TO_TABLE_ARGUMENT>
            <TO_COLUMN_ARGUMENT>
            <TO_COLUMNTYPE_ARGUMENT>
            {<TO_OPTIONAL_ARGUMENTS>}
<TO_OPTIONAL_ARGUMENTS>::=<TO_RELTABLE_ARGUMENT>
            <TO_RELCOLUMN_ARGUMENT>
            <TO_RELCOLUMNTYPE_ARGUMENT>
<FROM_CLASS_ARGUMENT>::=FROM_CLASS class_name
<FROM_ATTRIBUTE_ARGUMENT>::=FROM_ATTRIBUTE attribute_name
<FROM_ATTRIBUTETYPE_ARGUMENT>::=FROM_ATTRIBUTE_TYPE attribute_type
<FROM_TABLE_ARGUMENT>::=FROM_TABLE table_name
<FROM_COLUMN_ARGUMENT>::=FROM_COLUMN.column_name
<FROM_COLUMNTYPE_ARGUMENT>::=FROM_COLUMN_TYPE column_type
<FROM_RELTABLE_ARGUMENT>::=FROM_RELTABLE table_name
<FROM_RELCOLUMN_ARGUMENT>::=FROM_RELCOLUMN column_name
<FROM_RELCOLUMNTYPE_ARGUMENT>::=FROM_RELCOLUMN_TYPE column_type
<TO_CLASS_ARGUMENT>::=TO_CLASS class_name
<TO_ATTRIBUTE_ARGUMENT>::=TO_ATTRIBUTE attribute_name
<TO_ATTRIBUTETYPE_ARGUMENT>::=TO_ATTRIBUTE_TYPE attribute_type
<TO_TABLE_ARGUMENT>::=TO_TABLE table_name
<TO_COLUMN_ARGUMENT>::=TO_COLUMN column_name
<TO_COLUMNTYPE_ARGUMENT>::=TO_COLUMN_TYPE Column_type
<TO_RELTABLE_ARGUMENT>::=TO_RELTABLE table_name
<TO_RELCOLUMN_ARGUMENT>::=TO_RELCOLUMN column_name
<TO_RELCOLUMNTYPE_ARGUMENT>::=TO_RELCOLUMN_TYPE column_type
\end{verbatim}
```

5. Code Generation

Once the data store schema is mapped to the object schema, the user may use code generators 410 or 420 to generate data access methods for each object interface. For example, the user may have created classes MyEmp and MyDept, created tables EMP and DEPT, and mapped MyEmp to EMP and MyDept to DEPT with the following mappings:

| Attribute | Type | Column | Type |
|---|---|---|---|
| MyEmp Class to EMP Table mapping | | | |
| EMPNAME | string | EMPNAME | char |
| EMPNO | long | EMPNO | integer |
| WORKDEPT | long | WORKDEPT | integer |
| MyDept Class to DEPT Table Mapping | | | |
| DEPTNAME | string | DEPTNAME | char |
| DEPTNO | long | DEPTNO | integer |

To generate SOM IDL, for example, the user may select a MyEmp class icon in a Smart Schema window to display a popup menu containing a Generate Access Methods menu item. The user may then select the Generate Access Methods menu item to display a list of options such as SOM, C++, SmallTalk, etc. The user may then select SOM to generate all the SOM related files. The user may then repeat this process for the MyDept class.

The code generator generates the following files for the MyEmp class and the MyDept class when SOM is selected:

| MyEmp Files | MyDept Files | Purpose |
| --- | --- | --- |
| myemp.idl | mydept.idl | IDL file containing data access methods for the class |
| myemp.cpp | mydept.cpp | SOM C++ method implementation |
| myemp.sqc | mydept.sqc | SQL statement that needs to be pre-processed |
| myemp.mak | mydept.mak | Makefile for building the class |

The myemp.idl file is listed below:

```
#include <somobj.idl>
interface MyEmp : SOMObject
{
        attribute string<20> EMPNAME;
        attribute long EMPNO;
        attribute long WORKDEPT;
        void add( );
        void update ( );
        void del( );
        void retrieve( );
        #ifdef__SOMIDL__implementation
        {
                releaseorder :
                        _get_EMPNAME, _set_EMPNAME,
                        _get_EMPNO, _set_EMPNO,
                        _get_WORKDEPT, _set_WORKDEPT,
                        add,
                        update,
                        del,
                        retrieve;
        };
        #endif
};
```

Two constructors are generated, one is a default constructor, and the other one initializes all the data members of the class. The data members correspond to the columns in the table.

Four data access methods are generated:

add() to add a new instance to the EMP table;

update() to update an existing instance in the EMP table;

del() to delete! an instance from the EMP table; and retrieve() to retrieve an instance by key from the EMP table.

After the user has generated the SOM classes, a Data Store Manager provides the following IDL interfaces and implementations that may be used to connect to and perform transactions in the data store:

ClientDataStoreMgr;

DatastoreConnection; and

UserEnvironment.

The IDL interfaces and descriptions of ClientDataStoreMgr, DatastoreConnection, and UserEnvironment are as follows:

```
// ClientDataStoreMgr IDL Description
        interface ClientDatastoreMgr : SOMObject
        {
                void connect(in DatastoreConnection connection,
                        in string datastore_id,
                        in string user_name,
                        in string authentication);
                void disconnect(in DatastoreConnection connection);
                void transact(in UserEnvironment user_envir,
                        in short completion_type);
        };
// DatastoreConnection IDL Description
        interface DatastoreConnection : SOMObject
        {
                void set_option(in long option, in any value);
                void get_option(in long option, out any value);
        };
// UserEnvironment IDL Description
        interface UserEnvironment : SOMObject
        {
                void set_option(in long option, in any value);
                void get_option(in long option, out any value);
                void releases( );
        };
```

A sample SOM base client application using the above IDL interfaces to connect and perform transactions in the data store is as follows:

```
// Sample SOM Base Client Application
// To connect to the data store
        Environment *ev;
        DatastoreConnection *dsc;
        ClientDataStoreMgr *dsm;
        ev = someGetGlobalEnvironment( );
//      Create Datastore connection object
        dsc = new DatastoreConnection;
//      Connect to Datastore
        dsm = new ClientDatastoreMgr;
        dsm->connect(ev, dsc, "datastoreid", "chris", "password");
// To add a new MyEmp and MyDept object
        MyDept *dept;
        MyEmp *emp;
        dept = new MyDept;
        emp = new MyEmp;
//      To add a MyDept object
                dept->set_DEPTNAME(ev, "ADTC") ;
                dept->set_DEPTNO(ev, 846);
                dept->add(ev);
//      To add a MyEmp object
                emp->set_EMPNAME(ev, "Dex");
                emp->set_EMPNO(ev, 100);
                emp->set_WORKDEPT(ev, 846);
                emp->add(ev);
//      To update an existing MyDept object with key value 123
                dept-set_DEPTNO(ev, 123);
                dept->set_DEPTNAME(ev, "ADTI");
                dept->update(ev);
//      To retrieve an existing MyEmp object with key value 70
                emp->set_EMPNO(ev, 70);
                emp->retrieve(ev);
//      To delete an existing MyDept object with key value 123
                dept->set_DEPTNO(ev, 123);
                dept->del(ev);
//      To commit transactions and disconnect from the datastore
                dsm = transact(ev, ue, "COMMIT");
                dsm->disconnect(ev, dsc);
```

Once the user has developed a client application such as the one above, the user may compile and link the client application with the appropriate run-time (for example, a SOM run-time library, C++ run-time library, SmallTalk run-time library, etc.).

Although the above preferred embodiment is described primarily relative to mappings between object schema and relational data store schema, the teachings of this preferred embodiment may be extended to provide alternative embodiments which also provide mappings between object schema and other non-relational data store schema, including, but not limited to, hierarchial data store schema, flat file data store schema, network data store schema, and object data store schema. In these alternative embodiments, the teachings of the Smart Schema may be extended to support the display, selection, mapping, SMDL generation, SMIR generation, and code generation required for these other types of non-relational data store schema. Similarly, the teachings of the Smart Access, SMDL, SMIR may also be extended to support these other types of non-relational data store schema.

For example, in an alternative embodiment supporting hierarchial datastores, Smart Schema may be modified to display and select hierarchial data store schema. Schema Mapper may be modified to display, select, and map objects to hierarchial schema. Schema Mapper may be further modified to allow the mapping between hierarchical schema and object classes, the mapping between hierarchical schema segments and object schema interfaces, and the mapping between hierarchial schema fields and object schema attributes.

Such an alternative embodiment of the Schema Mapper may support the following mappings:

Hierarchial Data Schema (HDS) to Class
    One HDS to one class
    One HDS to many classes
    Many HDS's to one class
Class to HDS
    One class to one HDS
    One class to many HDS
    Many classes to one HDS
Field to Attribute
    One field to one attribute
    One field to many attributes
    Many fields to one attribute
Attribute to Field
    One attribute to one field
    One attribute to many fields
    Many attributes to one field SMIR, SMDL, and their associated parser and generator may be extended to support such hierarchial mappings. In particular, the extensible nature of the Schema Mapping Definition Language is well suited to adding additional constructs or modifying existing constructs to support such hierarchial mappings. The Schema Mapping Definition Language constructs may be modified or extended as follows.

The DATASTORE construct requires no modification, only the specification of a hierarchial data store type, IHDS/IMS for example, instead of a relational data store type.

```
DATASTORE_ID my_ds_id
    DATASTORE_TYPE IHDS/IMS
    DATASTORE_NAME my_ds_name (DBNAME or
    PSBNAME)
    USER_NAME my_name
    AUTHENTICATION abcde
END_DATASTORE_IS
```

The INTERFACE construct may be modified by adding a SEGMENT keyword and its list of segments, wherein the SEGMENT keyword is only applicable when the DATASTORE_TYPE is a hierarchial data store type. For such a hierarchial INTERFACE construct, the KEY list is a list of hierarchial field names instead of a list of column names as in the relational case. Similarly, the KEY_TYPE list is a list of hierarchial field types instead of a list of column types as in the relational case. These modifications yield the following hierarchial INTERFACE construct:

```
INTERFACE interface_name
    SCOPE attribute_name_1, attribute_name_2, . . .,
    attribute_name_1
    DATASTORE_ID my_ds_id
    SEGMENT seg_id_1, seg_id_2, . . ., seg_id_m
    KEY field_name_1, field_name_2, . . ., field_name_n
    KEY_TYPE field_type_1, field_type_2, . . ., field_type_n
    #
    # begin attribute mapping definition
    # . . .
    # end attribute mapping definition
    #
END_INTERFACE
```

The ATTRIBUTE construct may be modified by adding a FIELD keyword and it, list of arguments identifying the field, wherein the FIELD keyword is only applicable when the DATASTORE_TYPE is a hierarchial data store type. For such a hierarchial ATTRIBUTE construct, the FIELD argument list may include sufficient hierarchial descriptors to identify the data, such as pcb_name, seg_name, field_type, field_length, and field_offset. In addition, a CONV keyword may be added to specify the data conversion method, method_name, to be used for converting between hierarchial data types and object data types. These modifications yield the following hierarchial ATTRIBUTE construct:

```
ATTRIBUTE attribute_name
    ATTRIBUTE_TYPE attr_type
    FIELD pcb_name seg_name field_type field_length
    field_offset
    CONV method_name
END_ATTRIBUTE
```

The Schema Mapper may also provide datatype mappings, both default and allowable, between hierarchial datatypes and object datatypes. Table 7 lists and describes the data types defined in one hierarchial data store, IBM IMS/ESA for example. By default, a default IMS hierarchial data type to ODL data type mapping is provided. This default mapping is specified in Table 8. The allowable override mappings from which the user may select are specified in Table 9.

Similarly, the teachings of the Smart Access, code generation, and run time support may also be extended to support these other types of non-relational data store schema.

Beyond the above alternative embodiment supporting hierarchial data stores, the teachings of this preferred embodiment may be extended to provide alternative embodiments which also provide mappings between object schema and flat file data store schema, mappings between object schema and indexed file systems data store schema, mappings between object schema and network data store schema, and mappings between different object data store schema.

Using the foregoing specifications, the invention may be implemented using standard programming techniques. The resulting programs may be stored on disk, diskettes, memory cards, ROM or any other memory device for use in a computer. For execution, the program may be copied into the RAM of the computer. One skilled in the art of computer science will easily be able to combine the software created as described with appropriate general purpose or special purpose computer hardware to create a system for executing the programs. While the preferred embodiment of the present invention has been illustrated in detail, it should be apparent that modifications and adaptations to that embodiment may occur to one skilled in the art without departing from the scope of the present invention as set forth in the following claims.

TABLE 1

ODL Data Types

| ODL Type | Description |
|---|---|
| long | range $-2^{31}...2^{31}-1$ |
| unsigned long | range $0...2^{32}-1$ |
| short | range $-2^{15}...2^{15}-1$ |
| unsigned short | range $0...2^{16}-1$ |
| float | IEEE single-precision floating point numbers double |
| double | IEEE double-precision floating point numbers |
| char | 8-bit quantity |
| boolean | TRUE FALSE |
| octet | 8-bit quantity that is guaranteed not to undergo any conversion when transmitted |
| any | any ODL type |
| struct | similar to C/C++ struct |
| union | a cross between C union and switch |
| enum | similar to C/C++ enum |
| sequence<type, n> | "type" specifies any ODL type. "n" specifies the maximum size of the sequence and is optional |
| string<n> | "n" specifies the maximum size of the string and is optional. |
| array | multi-dimensional, fixed-size array |
| interface | a type that is satisfied by any object that satisfies a particular interface |

TABLE 2

SQL Data Types

| SQL Type | Description |
|---|---|
| CHAR(n) | fixed length character string (1. . 254) |
| VARCHAR(n) | varying-length character string (1. . .4000) |
| LONG VARCHAR | long varying-length character string (1. . .32700) |
| GRAPHIC(n) | fixed length graphic string - DBCS (1. .127) |
| VARGRAPHIC(n) | varying-length graphic string - DBCS (1. .2000) |
| LONG VARGRAPHIC | long varying-length graphic string - DBCS (1. .16350) |
| BLOB | |
| SMALLINT | small integer $(-2^{15}...2^{15}-1)$ |
| INTEGER | large integer $(-2^{31}...2^{31}-1)$ |
| REAL | a 32 bit approximation of a real number |
| FLOAT | a 64 bit approximation of a real number |
| DECIMAL(p,s) | "p" specifies the precision which can be from 1 to 31. "s" specifies the scale which can be less than or equal to "p". |
| DATE | 10 byte character string designating (year, month, and day) |
| TIME | 8 byte character string designating (hour, minute, and second) |
| TIMESTAMP | 26 byte character string designating (year, month, day, hour, minute, second, and microsecond) |

TABLE 3

ODL to SQL Data Type Mapping

| ODL Type | SQL Type |
|---|---|
| long | CHAR(n), INTEGER, REAL, FLOAT, DECIMAL(p,s) |
| unsigned long | CHAR(n), INTEGER, REAL, FLOAT, DECIMAL(p,s) |
| short | CHAR(n), SMALLINT, INTEGER, REAL, FLOAT, DECIMAL(p,s) |
| unsigned short | CHAR(n), SMALLINT, INTEGER, REAL, FLOAT, DECIMAL(p,s) |
| float | CHAR(n), REAL, FLOAT, DECIMAL(p,s) |
| double | CHAR(n), FLOAT, DECIMAL(p,s) |
| char | CHAR(n), SMALLINT, INTEGER |
| boolean | CHAR(n), SMALLINT, INTEGER |
| octet | CHAR(n), SMALLINT, INTEGER, REAL, FLOAT, DECIMAL(p,s) |
| any | BLOB |
| struct | BLOB |
| union | BLOB |
| enum | CHAR(n), SMALLINT |
| sequence<type, n> | BLOB |
| string<n> | CHAR(n), VARCHAR(n), LONG VARCHAR, BLOB |
| array | BLOB |
| interface | BLOB, user defined |

TABLE 4

SQL to ODL Data Type Mapping

| SQL Type | ODL Type |
|---|---|
| CHAR(n) | any, sequence<char,n>, string<n>, array |
| VARCHAR(n) | any, sequence<char,n>, string<n>, array |
| LONG VARCHAR | any, sequence<char,n>, string<n>, array |
| GRAPHIC(n) | any, sequence<char,n>, string<n>, array |
| VARGRAPHIC(n) | any, sequence<char,n>, string<n>, array |
| LONG VARGRAPHIC | any, sequence<char,n>, string<n>, array |
| BLOB | any, sequence<char,n>, string<n>, array |
| SMALLINT | long, unsigned long, short, unsigned short, float, double, any, string<n> |
| INTEGER | long, unsigned long, double, any, string<n> |
| REAL | float, double, any, string<n> |
| FLOAT | double, any, string<n> |
| DECIMAL(p,s) | float, double, any, string<n> |
| DATE | string<n> |
| TIME | string<n> |
| TIMESTAMP | string<n> |

TABLE 5

Default SQL to ODL Data Type Mapping

| SQL Type | ODL Type |
|---|---|
| CHAR(n) | string<n> |
| VARCHAR(n) | string<n> |
| LONG VARCHAR | string<n> |
| GRAPHIC(n) | string<n> |
| VARGRAPHIC(n) | string<n> |
| LONG VARGRAPHIC | string<n> |
| BLOB | string<n> |
| SMALLINT | short |
| INTEGER | long |
| REAL | float |
| FLOAT | double |
| DECIMAL(p,s) | double |

TABLE 5-continued

Default SQL to ODL Data Type Mapping

| SQL Type | ODL Type |
|---|---|
| DATE | string<10> |
| TIME | string<8> |
| TIME STAMP | string<26> |

TABLE 6

Default ODL to SQL Data Type Mapping

| ODL Type | SQL Type |
|---|---|
| long | INTEGER |
| unsigned long | INTEGER |
| short | SMALLINT |
| unsigned short | SMALLINT |
| float | FLOAT |
| double | FLOAT |
| char | CHAR(1) |
| boolean | SMALLINT |
| octet | CHAR(1) |
| string<n> | CHAR(n) if n is specified and n<=254. VARCHAR(n) if n is specified and n<=4000. LONGVAR if n is not specified or if n>4000. |
| any | BLOB |
| struct | BLOB |
| union | BLOB |
| enum | SMALLINT |
| sequence<type, n> | BLOB |
| array | BLOB |
| interface | BLOB |

TABLE 7

IMS Hierarchial Data Types

| IMS Hierarchial Type | Description |
|---|---|
| pd numeric | packed decimal |
| zd numeric | zoned decimal |
| is numeric | integer short, two bytes long |
| il number | integer long, four bytes long |
| id numeric | integer double, eight bytes long |
| fs numeric | internal float number, four bytes long |
| fd numeric | internal float double, eight bytes long |
| ef numeric | external float double, language dependent |
| ne character | numeric edited, numeric (zoned decimal) with inserted character "0" or "/" or blank character |
| aa character | alphabetic, letter |
| an character | alphanumeric, letter and numeric |
| ce character | alphanumeric edited, alphanumeric (zoned decimal) with inserted character "0" or "/" or blank character |
| cc character | SBCS (single byte character set) character |
| cb character | character block data item, the first two bytes is length of block to indicate how many SBCS bytes will follow |
| gg character | DBCS (double byte character set) character |
| xb hexadecimal | hexadecimal block data item, the first two bytes is length of block to indicate how many bytes follow |
| xd hexadecimal | eight-bit hexadecimal item |

TABLE 8

Default Mapping Between ODL and IMS Hierarchial Data Types

Default ODL to IMS Hierarchial Data Type Mapping

| ODL Type | IMS Hierarchial Data Type |
|---|---|
| long | il |
| unsigned long | il |
| short | is |
| unsigned short | is |
| float | fs |
| double | fd |
| char | cc |
| boolean | is |
| octet | xd |
| string<n> | cb, fixed size of n SBCS characters (one segment only) |
| string | cb, variable length of SBCS characters (one segment only) |
| any | xb variable length |
| struct | xb variable length |
| union | xb variable length |
| enum | is |
| sequence<type, n> | xb variable length |
| array | xb variable length (one segment only) |
| interface | xb variable length (one segment only) |

Default IMS Hierarchial Data Type to ODL Mapping

| IMS Hierarchial Data Type | ODL Type |
|---|---|
| xd | octet |
| cc | char |
| pd | long |
| zd | long |
| is | short |
| il | long |
| id | double |
| fs | float |
| fd | double |
| ef | string<n> |
| gg | string>n> |

TABLE 9

Allowed Mapping Between ODL and IMS Hierarchial Data Types

Allowed ODL to IMS Hierarchial Data Type Mapping

| ODL Type | IMS Hierarchial Data Type |
|---|---|
| long | il, pd, zd |
| unsigned long | il, pd, zd |
| short | is, pd, zd |
| unsigned short | is, pd, zd |
| float | fs |
| double | fd |
| char | cc, is, il |
| boolean | is |
| octet | xd, is |
| string<n> | cb, fixed size of n SBCS characters (one segment only) |
| string | cb, variable length of SBCS characters (one segment only) |
| any | xb variable length |
| struct | xb variable length |
| union | xb variable length |
| enum | is, cc(n) |
| sequence<type, n> | xb variable length |
| array | xb variable length (one segment only) |
| interface | xb variable length (one segment only) |

TABLE 9-continued

Allowed Mapping Between ODL and
IMS Hierarchial Data Types

Allowed IMS Hierarchial Data Type to ODL Mapping

| IMS Hierarchial Data Type | ODL Type |
| --- | --- |
| xd | octet |
| cc | char |
| pd | long, short |
| zd | long, short |
| is | short, long |
| il | long |
| id | double |
| fs | float |
| fd | double |
| ef | string<n> |
| gg | string<n> |

We claim:

1. A system for mapping objects to a data store, said system comprising:

a first graphical user interface for mapping an object schema to a data store schema;

a data structure for embodying said mapping, said data structure supporting said first graphical user interface and supporting a run-time access;

a high level language generator for generating, from said data structure, a high level language representing said mapping;

a parser for parsing said high level language into said data structure; and a translator for creating from said data structure and displaying said first graphical user interface representation of said mapping.

2. A system for mapping and accessing objects in data stores, said system comprising:

graphical user interface for defining a mapping between an object schema and a data store schema in a high level language;

a first graphical user interface for mapping said object schema to said data store schema;

a data structure for embodying said mapping, said data structure supporting said first graphical user interface and supporting a run-time access;

high level language generator for generating, from said data structure, said high level language representing said mapping;

a parser for parsing said high level language into said data structure;

a translator for creating said first user interface representation of said mapping from said data structure;

a second user interface, dependent upon an application programming interface, for accessing object data from said data store;

said application programming interface, independent of said second user interface, for accessing object data from said data store;

a run-time component executing said application programming interface and implementing said object data access from said data store;

a data store access for said run-time component to utilize said data structure embodying said mapping definition in accessing said objects from said data store; and a generator for generating, from said data structure, an object oriented programming language and data access language for deleting, adding, retrieving, and updating objects from said data store.

3. A method of mapping objects to a data store, said method comprising the steps of:

mapping an object schema to a data store schema via a first graphical user interface;

embodying said mapping in a data structure supporting said first graphical user interface and supporting a run-time access;

generating, from said data structure, a high level language representing said mapping;

parsing said high level language into said data structure; and creating from said data structure and displaying said first graphical user interface representation of said mapping.

4. A method of mapping and accessing objects in data stores, said method comprising the steps of:

defining a mapping between an object schema and a data store schema in a high level language via a graphical user interface;

mapping said object schema to said data store schema via a first graphical user interface;

embodying said mapping in a data structure supporting said first graphical user interface and supporting a run-time access;

generating, from said data structure, said high level language representing said mapping;

parsing said high level language into said data structure;

creating said first user interface representation of said mapping from said data structure;

accessing object data from said data store via a second user interface, dependent upon an application programming interface;

accessing object data from said data store via said application programming interface, independent of said second user interface;

implementing said object data access from said data store via a run-time component executing said application programming interface;

accessing said objects from said data store by said run-time component utilizing said data structure embodying said mapping definition; and generating, from said data structure, an object oriented programming language and data access language for deleting, adding, retrieving, and updating objects from said data store.

5. An article of manufacture for use in a computer system for mapping objects to a data store, said article of manufacture comprising a computer-readable storage medium having a computer program embodied in said medium which causes the computer system to:

map an object schema to a data store schema via a first graphical user interface;

embody said mapping in a data structure supporting said first graphical user interface and supporting a run-time access;

generate, from said data structure, a high level language representing said mapping;

parse said high level language into said data structure; and create from said data structure and display said first graphical user interface representation of said mapping.

6. An article of manufacture for use in a computer system for mapping objects to a data store, said article of manufacture comprising a computer-readable storage medium having a computer program embodied in said medium which causes the computer system to:

define a mapping between an object schema and a data store schema in a high level language via a graphical user interface;

map said object schema to said data store schema via a first graphical user interface for;

embody said mapping in a data structure supporting said first graphical user interface and supporting a run-time access;

generate, from said data structure, said high level language representing said mapping;

parse said high level language into said data structure;

create said first user interface representation of said mapping from said data structure;

access object data from said data store via a second user interface, dependent upon an application programming interface;

access object data from said data store via said application programming interface, independent of said second user interface;

implement said object data access from said data store via a run-time component executing said application programming interface;

access said objects from said data store by said run-time component utilizing said data structure embodying said mapping definition; and generate, from said data structure, an object oriented programming language and data access language for deleting, adding, retrieving, and updating objects from said data store.

* * * * *